US010723515B2

(12) United States Patent
Beckman

(10) Patent No.: US 10,723,515 B2
(45) Date of Patent: Jul. 28, 2020

(54) TECHNIQUES FOR STOWING AND SHIPPING MERCHANDISE AT A SHOPPING AREA

(71) Applicant: Christopher V. Beckman, Los Angeles, CA (US)

(72) Inventor: Christopher V. Beckman, Los Angeles, CA (US)

( * ) Notice: Subject to any disclaimer, the term of this patent is extended or adjusted under 35 U.S.C. 154(b) by 266 days.

(21) Appl. No.: 15/856,023

(22) Filed: Dec. 27, 2017

(65) Prior Publication Data

US 2018/0105325 A1  Apr. 19, 2018

Related U.S. Application Data

(63) Continuation-in-part of application No. 15/437,509, filed on Feb. 21, 2017, which is a continuation-in-part
(Continued)

(51) Int. Cl.
| | |
|---|---|
| *G06Q 20/20* | (2012.01) |
| *B65D 33/02* | (2006.01) |
| *B65D 33/00* | (2006.01) |
| *B65D 33/06* | (2006.01) |
| *G06Q 20/18* | (2012.01) |
| *E05G 1/00* | (2006.01) |
| *B65D 33/18* | (2006.01) |
| *A45C 3/04* | (2006.01) |
| *E05F 15/77* | (2015.01) |
| *E05G 1/10* | (2006.01) |
| *G07G 1/00* | (2006.01) |
| *G06Q 10/08* | (2012.01) |

(52) U.S. Cl.
CPC ............... *B65D 33/02* (2013.01); *A45C 3/04* (2013.01); *B65D 33/004* (2013.01); *B65D 33/065* (2013.01); *B65D 33/18* (2013.01); *E05F 15/77* (2015.01); *E05G 1/005* (2013.01); *E05G 1/10* (2013.01); *G06Q 20/18* (2013.01); *G06Q 20/20* (2013.01); *G07G 1/0036* (2013.01); *G06Q 10/0836* (2013.01)

(58) Field of Classification Search
CPC ........................... B65D 33/02; B65D 33/1658
See application file for complete search history.

(56) References Cited

U.S. PATENT DOCUMENTS

| | | | |
|---|---|---|---|
| 2003/0083890 A1* | 5/2003 | Duncan ............... | B65D 5/5035 705/28 |
| 2008/0201155 A1* | 8/2008 | Som ...................... | A47F 10/00 705/1.1 |

(Continued)

OTHER PUBLICATIONS

YouTube video titled "Amazon Extends Grocery Delviery Service in Miami" by CBS Miami published on Jun. 28, 2017 and available at https://www.youtube.com/watch?v=S142voGLPAI. (Year: 2017).*

*Primary Examiner* — Blake A Tankersley

(57) ABSTRACT

New techniques for stowing and rapidly shipping valuables in a retail setting are provided. In some aspects of the invention, a new form of coded shopping bag, configured to covert to a box (a.k.a. a "BagBox") for on-location holding and/or shipping is provided. Systems and methods for Bag-Box conversion, stowing and/or shipping via specialized kiosks are provided. Billing methods based on the coding and recorded user preferences are also provided.

18 Claims, 12 Drawing Sheets

Related U.S. Application Data of application No. 14/214,651, filed on Mar. 14, 2014, now Pat. No. 9,574,390, which is a continuation-in-part of application No. 13/783,416, filed on Mar. 4, 2013, now abandoned.

(60) Provisional application No. 61/852,124, filed on Mar. 15, 2013.

(56) References Cited

U.S. PATENT DOCUMENTS

| | | | |
|---|---|---|---|
| 2015/0348345 A1* | 12/2015 | Ogishi | G06Q 10/083 340/5.6 |
| 2018/0148226 A1* | 5/2018 | Thirumurugavel | B65D 33/02 |
| 2019/0057350 A1* | 2/2019 | Simms | H04N 7/183 |

* cited by examiner

TECHNIQUES FOR STOWING AND SHIPPING MERCHANDISE AT A SHOPPING AREA

CROSS-REFERENCE TO RELATED APPLICATION

This application is a continuation-in-part of co-pending U.S. patent application Ser. No. 15/437,509, filed Feb. 21, 2017, which is a continuation-in-part of U.S. patent application Ser. No. 14/214,651, filed Mar. 14, 2014, now U.S. Pat. No. 9,574,390, which, in turn, claims the benefit of U.S. Provisional Application No. 61/852,124, filed Mar. 15, 2013. This application also is a continuation-in-part of co-pending U.S. patent application Ser. No. 13/783,416, filed Mar. 4, 2013. The entire contents of each of the above applications are hereby incorporated by reference into the present application.

FIELD OF THE INVENTION

The present invention relates to techniques using portable devices for securing and monitoring valuables. The present invention also relates to shipping containers for rapid transportation of merchandise.

BACKGROUND OF THE INVENTION

Beach recreation has been a popular activity for centuries in many warm regions of the world, such as Southern California, Southern Europe, Australia, the Caribbean, and the Pacific Islands. At the beach, vacationers engage in a wide variety of athletic and leisure activities, such as sunbathing, volleyball, running, swimming and surfing.

Losing one's keys or other valuables at the beach can pose a difficult problem, because beaches are typically covered in sand or other loose particles that can envelope and hide small objects. Beach grounds can be homogenous and expansive, making the later location of unattended objects difficult. Unattended objects may also pose a risk of being stolen, especially at busier beaches, and when at least one person in a party does not keep watch in an area near the objects. The risk of monetary loss from theft generally increases A) inversely with the size of the object, and B) directly with the value of the object; and factors A and B themselves generally correlate inversely with one another, though not always, in a beach recreation context.

Other public settings, such as shopping malls, also present unique challenges for shoppers safeguarding valuables. Generally, those challenges are mitigated by shoppers naturally keeping shopping bags in-hand, under their conscious control, while shopping. At times, however, shopping bags can be inconvenient and distracting to a shopper's other activities, such as continued shopping and dining. When too many bags, or bags that are too large, are in-hand, a shopper may need or wish to make several trips to his or her motor vehicle to drop off shopping bags, or arrange for delivery of some items through the store, to continue shopping and other activities in the area (e.g., dining and entertainment). Generally speaking, independently arranging a commercial shipment of purchased goods is more inconvenient than simply continuing to carry shopping bags and the other options set forth above—even when a postal office is located within a shopping mall—and, thus, users will tend to exercise those other options for managing purchased goods.

It should be understood that the disclosures in this application related to the background of the invention in, but not limited to, this section titled "Background," are to aid readers in comprehending the invention, and do not set forth prior art or other publicly known aspects affecting the application; instead, the disclosures in this application related to the background of the invention comprise details of the inventor's own discoveries, observations, and other work and work results, including aspects of the present invention. Nothing in the disclosures related to the background of the invention is or should be construed as an admission related to prior art or the work of others prior to the conception or reduction to practice of the present invention.

SUMMARY OF THE INVENTION

New devices and techniques for safeguarding valuables in a public setting, such as a beach recreation setting, and a shopping mall, are provided. In some aspects of the invention, a specialized portable safe is streamlined on some surfaces for insertion and securing into sand or other loose ground particles, with at least one removal-resisting edge or anchor. In a preferred embodiment, the edge or anchor is shaped to permit easily inserting the safe into the ground, but resists removal by forces in a substantially opposing direction, and the edge or anchor may be switched for release by an authorized user (e.g., with a key or wireless lock actuator). In further aspects, the invention comprises a settable tamper-detecting alarm. In other aspects, a compartment access door (which, in some aspects, may be locked or unlocked by an authorized user) permits the placement, securing and removal of valuables from a compartment of the safe, even when mounted the safe is mounted in the ground.

In other aspects of the invention, new wireless locking, unlocking and alerting techniques are provided. In some embodiments, a computer hardware and software control system configured with proximity sensors and a tag or beacon within a waterproof fob carried by a user are included. In these embodiments, a user may substantially cover the safe to avoid theft while away, and, when returning sufficiently close to the general area, be reminded of the precise location of the safe by a specialized proximity-indicating visible, audible, tactile and/or other alert(s) from the safe and/or fob. Preferably, this alert(s) is less intense and bothersome to nearby people than the tamper-detecting alarm, if also provided in the same particular embodiment.

In other aspects, the alerting techniques may include local communications directed to a computer system within the safe's lockable compartment, enabling the extension of range and exporting signals with enhanced security through a smart device held within the safe. In other aspects, segregated scrap memory is provided, featuring data offboarding from a main computer system and redundant control of user interface controls.

In still other aspects, a new form of coded shopping bag, configured to covert to a box (a.k.a. a "BagBox") for on-location holding and/or shipping is provided. Systems and methods for BagBox conversion, stowing and/or shipping via specialized facilities (such as dedicated stowing and/or shipment kiosks) are provided. Billing methods based on the coding and recorded user preferences are also provided.

Canons of Construction and Definitions

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

"Tampering stimulus," in addition to its ordinary meaning and special meaning in the art to which it pertains, means movement, touching, bending, compression, extension, vibration, energy or other insult(s) associated with an attempt to gain entry to, gain access to, exercise control over and/or abscond with property subject to and/or a person subject to such insult. Tampering stimulus may also refer to a pattern and/or repetition of such insults.

"Loose particles," in addition to its ordinary meaning and special meaning in the art to which it pertains, means a group of particles that may or may not be still with respect to one another but that, in either instance, may be moved relative to one another by applying physical force to some of the particles.

"Personal area," in addition to its ordinary meaning and special meaning in the art to which it pertains, means an area of ground or volume of space occupied by an individual or group of individuals, his, her or their belongings, current activities, and an additional margin set by control, ownership or respect, in which the individual or group is at least predominantly and exclusively to use for his, her or their own occupation or activities.

"Portable security device," in addition to its ordinary meaning and special meaning in the art to which it pertains, means a device that may be carried by hand, and which may be installed and uninstalled without the use of additional tools (other than the device) and that comprises or is comprised in hardware of a computer system, and is capable of safeguarding a person or property, at least in part, by detecting tampering stimulus related to said property, even if said property is not held within said portable security device.

"Positively compares," in addition to its ordinary meaning and special meaning in the art to which it pertains, with respect to data representing a condition and another condition, means that the data represents or matches the condition, or that at least one compared parameter of the condition meets or satisfies at least one compared parameter of the data.

"BagBox," in addition to its ordinary meaning and special meaning in the art to which it pertains, means a flexible, handheld bag configured for conversion to a less-flexible (more rigid) shipping container.

DETAILED DESCRIPTION OF THE INVENTION

Figure 1:
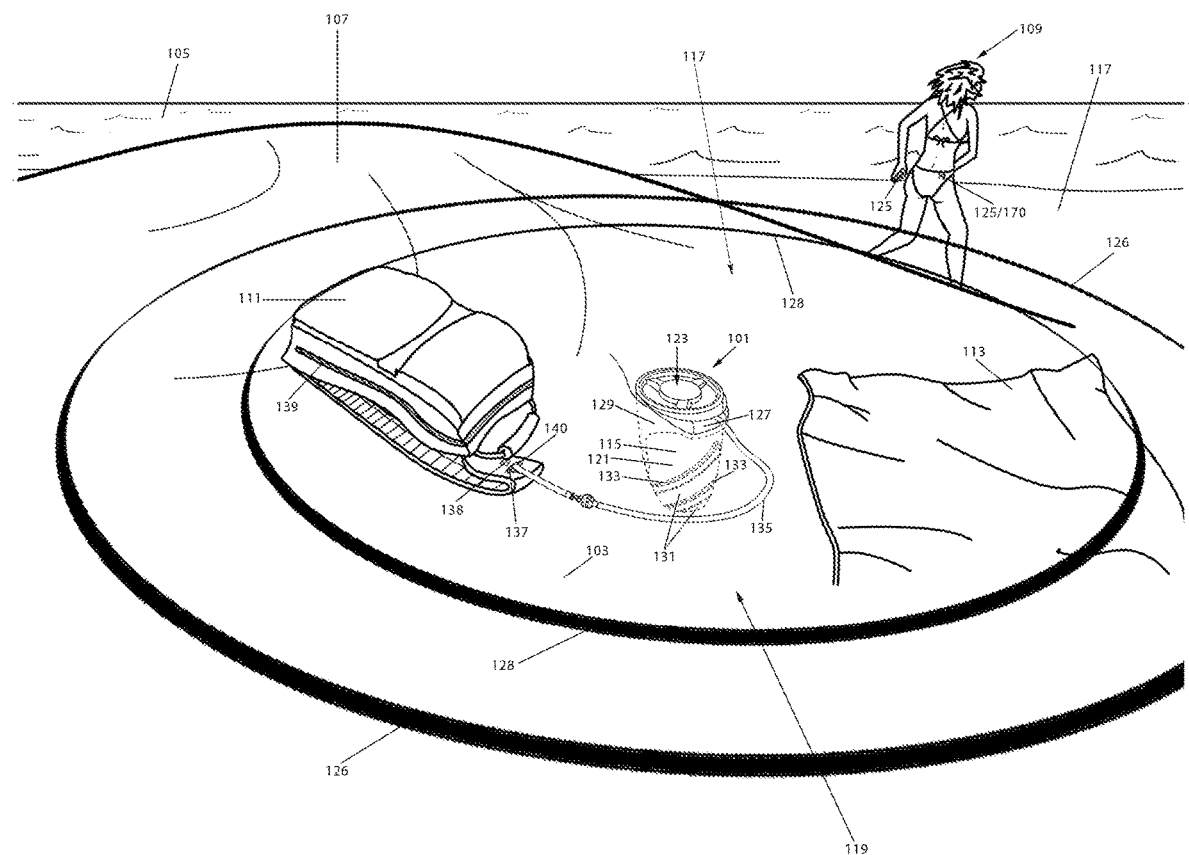
FIG. 1 is a perspective view of a contextual scene demonstrating the use of exemplary aspects of the present invention, including, but not limited to, a portable security device for safeguarding valuables buried in a sandy beach.

FIG. 1 is a perspective view of a scene demonstrating the use of exemplary aspects of the present invention, including a portable security device 101, installed into a sandy beach 103. The surrounding environment captured in the figure also includes sea 105, a sand dune 107, a user 109 of security device 101, the user's backpack 111 and the user's beach towel 113. In the scene pictured, user 109 has installed security device 101 by partially burying it in sand 117 of a personal area 119 of the beach that she has encamped within, and established, at least in part, by so encamping. More specifically, she has encamped within personal area 119 by laying out her beach towel 113, placing her backpack 111 and installing security device 101 in the same personal area on the sand 117. Generally, personal areas, such as 119, may be set up on a beach in a wide range of ways, involving the visible exercise of control, dominion and activity in an area. One way, as pictured, comprises setting up personal belongings within a common area that can be reached within an arm's or body's length of the user, or within a few paces, such that the user does not have to rise to his or her feet, or travel a significant distance to access them. In other instances, a personal area may be set up merely by occupying that area, in which case the personal area comprises the area occupied by a person's body, and a further area of personal space. Larger personal areas, such as those encamped by a group of persons, may also be created. In such instances, whether or not they are created by placing belongings or by activity, a shared personal area may be encamped that is substantially larger than that created by an individual person, and may comprise an area several paces in radius or other dimensions—typically increasing with the size of the group of persons. The manner and extent of encampment and personal area definition may also be determined by different local customs, rules and conditions affecting the campground, surrounding town or country, or other place of encampment. In the exemplary scene provided in FIG. 1, however, a relatively small personal area, 119, has been created, for the use of user 109 alone, with a radius of approximately 7 feet.

Some time after setting up personal area 119, user 109 decided to temporarily leave her personal area 119. As a result, user 109 is pictured at a distance exceeding 20 feet from personal area 119, and security device 101, and is pictured facing away from that personal area. In addition, even if she were facing her personal area 119, her view of her belongings (comprising her backpack 111, portable security device 101, and beach towel 113) would be substantially blocked by sand dune 107. In other words, she can no longer see her personal belongings within personal area 119, and has diverted her attention to other, beach recreational activities, such as swimming or surfing.

For purposes of discussion and better understanding aspects of the present invention, it should be understood that user 109 left several valuable items (not all of which are separately pictured in FIG. 1) within her personal area 119, such as car and house keys, money, a smartphone and jewelry. Some of these valuable items have been left in her backpack 111, while the most valuable, small items (such as keys and a wallet) have been placed in a central storage chamber 121 of portable security device 101. As will be explained in greater detail below, among other aspects, portable security device 101 comprises a lockable surface door 123, through which the user placed those valuable, small items, and then secured them in chamber 121 by closing and locking surface door 123. As also will be discussed in greater detail below, user 109 armed portable security device 101, utilizing at least one of several possible procedures, to detect and issue alerts related to tampering attempts. In some embodiments, a user-carried fob and/or beacon 125 (pictured in two, among virtually unlimited, possible positions) may be used, which aids in arming and disarming portable security device 101, alerting the user and other people concerning tampering and other conditions, locating portable security device 101 and locking, unlocking, opening and closing portable security device 101. In some embodiments, fob beacon 125 may automatically issue commands for such arming, disarming, locking, unlocking, locating and alerting, based on an assessed movement or distance from portable security device 101, and whether or not those distances meet or exceed predefined limits or other measures. Such limits or other measures can be set by the user and a computer hardware and software system comprised in portable security device 101 and the fob/beacon 125. In some embodiments, the user may issue commands using fob beacon 125, among other things, to carry out such arming, disarming, locking, unlocking, locating and alerting.

In the scene pictured, portable security device 101 is partially buried in sand dune 107, with more than ⅔rds, ¾ths, and even more than ⁹⁄₁₀ths of its outer housing 115 covered from view by the sand 117. However, the particular degree of burying shown is only one of several useful embodiments of proper installation. In fact, in some other method of use embodiments, portable security device 101 may be completely buried, or not buried at all, and remain secure, accessible and able to detect tampering stimuli and alert a user and others of such stimuli and its location. The partial burying shown, however, is useful because locking surface door 123 may remain accessible, with minimal sand pouring into it, while maintaining a low enough profile to be blocked by dunes from more distant viewing angles to avoid attracting thieves. Also in the partially buried configuration pictured, an installation and carrying handle 127 may still be easily located and accessed by a user because it is located near, but to the side of, the locking surface door 123, and angled attachment trusses 129, which aid in driving portable security device 101 into the ground during installation. In some embodiments, installation and carrying handle 127 may extend above the vertical level of locking surface door 123 (at least, when closed), allowing locking surface door 123 to be completely buried while the handle 127 remains visible. To aid in driving device 101 into the ground during burying, housing 115 is generally torpedo-shaped and otherwise streamlined, on surfaces penetrating sandy beach 103. In addition, housing 115 and surface door 123 may be of a stiff, hard, strong material and structure, to aid in so driving device 101 into the ground. However, in some embodiments, housing 115 may be composed of a more flexible material, including, but not limited to a cloth. However, the locking/unlocking structures discussed in this application for portable security devices generally benefit from stiffer hardware and, as such, materials composing the lock mechanism, such as door 123, its locking hardware, and locking hardware of the remainder of device 101 preferably comprise some hard, stiff materials. The particular shape of device 101, housing 115 and door 123 may be varied depending on the aspects of the invention emphasized in a particular embodiment. For example, in some embodiments, device 101 may not be intended for burying and, instead, may have a more shallow, wider vertical profile, and a smaller lock or door mechanism, or a door may be omitted in favor of a control system actuated lock operating on a zipper, slit or other smaller opening.

As will be explained in greater detail below, portable security device 101 comprises extendible outer threading 131, which may be extended or retracted from housing 115 through threading slots 133 by a user or by a computer hardware-actuated system. Outer threading 131 aids in both installation, acting as an auger for driving portable security device 101 into the sand, and in security by holding portable security device in the ground and acting as a probe attached to sensor(s) detecting movements, once installed.

User 109 has joined backpack 111 to portable security device 101 via a specialized tether 135. Specifically, user 109 has wrapped or tied tether 135 to carrying handle 127. As will be explained in greater detail below, by so joining backpack 111 and portable security device 101, user 109 can, in effect, apply many of the security, alerting and other portable security functions of device 101 to backpack 111, and valuables placed within it. Briefly, tether 135 may be pulled tight (e.g., by a retracting spool within backpack 111, drawing the tether into slot 137) against handle 127 such that tampering movements of backpack 111 are likely to jostle portable security device 101. Device 101, in turn, may issue tampering motion alerts and alarms related to such tampering, as discussed at length elsewhere in this application. Other items in user 109's personal area 119, such as beach towel 113, may be worth too little or otherwise pose too low a risk of loss from separate theft to warrant such connection with personal security device 101 and, as such, beach towel 119 is shown unconnected to device 101, aside from also being located within the same personal area 119. However, such items may be easily placed on safe 101, tucked through handle 127, or otherwise physically associated with safe 101 to apply some of safe 101's security aspects to them.

In some embodiments, tether 135 may communicate with a computer hardware system managing personal security device 101 and tamper-detecting sensors may be located on both backpack 111 (or other such personal effects) or personal security device 101. In some embodiments, a wired connection for relaying sensory data and other communications may be resident in tether 135, and a plug and receptacle may enable the connection and disconnection of portable security device 101 and the backpack 111 (or other such personal effects) via tether 135—with respect to both a physical connection and a communications connection. In still other embodiments, tampering with backpack 111 (e.g., attempting to unzip and open backpack 111 via zipper 139) may cause the retraction of tether 135 or other signaling to a computer system managing personal security device 101, triggering alert, alarm or other security aspects of the present invention to be applied and carried out.

Figure 2:
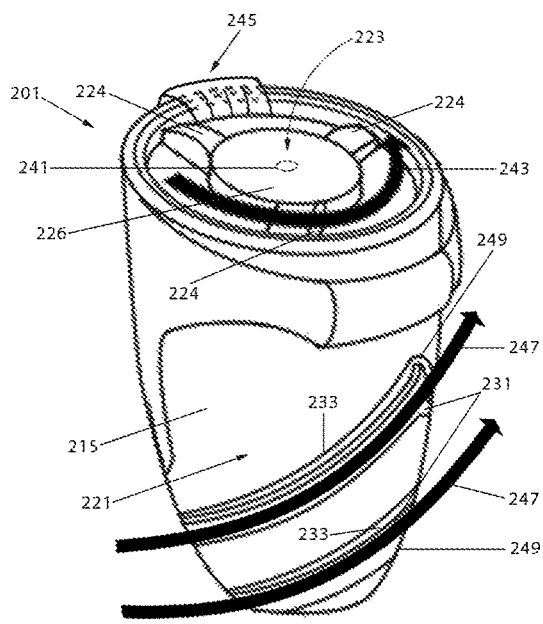
FIG. 2 is a perspective view an exemplary portable security device with a closed lockable surface door, and techniques for use of the portable security device, in accordance with aspects of the present invention.

FIG. 2 is a perspective illustration of an exemplary portable security device 201, and techniques for its use, in accordance with aspects of the present invention. Portable security device 201 is similar in nature to portable security device 101, discussed with reference to FIG. 1, above, but is shown on a larger scale to aid in understanding certain additional aspects and embodiments of the present invention in greater detail. A lockable surface door 223, similar to lockable surface door 123 from FIG. 1, can be seen at the top of FIG. 2. Lockable surface door 223 comprises grip flanges 224. In order to open or close surface door 223, a user may rotate door 223 about a central axel 241, gripping grip flanges 224 to do so. If rotated in the counter-clockwise direction, as demonstrated by motion arrow 243, a user may unlock and then open lockable surface door 223. Upon completing that unlocking and opening action, after sufficient opening rotation, a user may further open lockable surface door 223 by pivoting it about a door hinge 245, which also is capable of aiding in closing, locking and holding lockable surface door 223 in place (when closed) or nearby (when open). The latter capability will be better understood with reference to FIG. 3, below.

Figure 3:
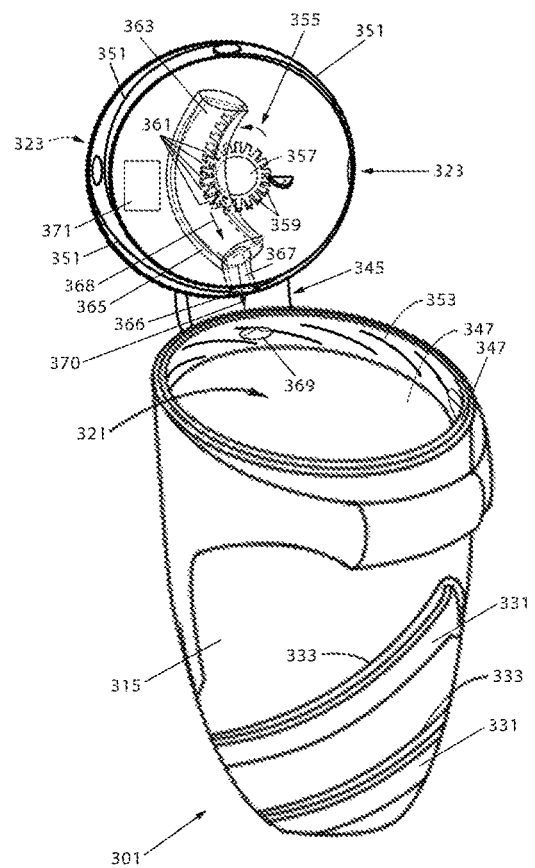
FIG. 3 is a perspective view of the same exemplary portable security device as pictured in FIG. 2, above, but with an opened lockable surface door, showing additional aspects of the present invention.

When rotated counter-clockwise, as discussed above, lockable surface door 223 (if fully closed and locked at that time) first causes an inner manifold (not pictured in FIG. 2) to also spin counter-clockwise. This manifold is shown in FIG. 3 as 347. As manifold 347 so rotates within and against the housing 215/315, laterally extending outer threading 231 connected to manifold 347 also rotates against housing 215, shifting within threading slots 233 in the general rotational direction demonstrated by motion arrows 247. Because outer threading 231 is based inside of housing 215, but also extends outward beyond outer housing 215, it collides at the right-side edges 249 of slots 233 as manifold 347 rotates counter-clockwise (viewed from the top of FIG. 2, looking down). In so colliding, threading 231 is then forced under and within outer housing 215 and, by a ramping process similar to geological subduction (but with the threading 231 descending under slots 233 rather than one tectonic plate descending below another), no longer extends outward beyond outer housing 215. The edges 249, or edges colliding with them during this process, are preferably sloped to ease the recession of outer threading 231. This subduction-like process and recession of outer threading 231 into housing 215 causes the outer surfaces of portable security device 201 to become smoother, and no longer threaded, and, as a result, easier to withdraw from ground in which it is installed. Also, during installation, in this smooth condition with recessed threads, portable security device 201 is easier to push straight into, and install into, a ground comprised of especially loose particles, such as a beach, although, alternatively, the threads may also aid in installation when extended by allowing the housing 215 to act as an auger, driving into the ground when the housing itself is twisted clockwise and pressed into the ground. To again expose and extend threads 231, a user may sufficiently turn door 223 clockwise (the opposite rotational direction of that pictured by motion arrow 243), leading threads 351 and 353 of FIG. 3, if sufficiently interlocked and tightened against one another, to drive manifold 347 clockwise and threads 331 to the center of slots 333, causing them to again extend outward from housing 215/315 and operate as threads. In this way, a user may further secure portable security device 201/301 in the ground in which it is installed. Further, in some embodiments, threads 331 may be connected with or comprise tactile, motion or other sensors and relay information concerning whether portable security device 201/301 is being moved or otherwise disturbed to a control system, which, in turn, may issue alerts and carry out other measures as discussed with respect to control systems elsewhere in this application. An exemplary control system is discussed in reference to FIG. 6, below.

If a user continues to rotate lockable surface door 223/323 clockwise, after fully exposing threads 231/331 through slots 233/333, preferably interlocking tabs (not pictured) or another type of stop on or connected with manifold 347 and housing 315 (or on either manifold 347 or housing 315) arrest and prevent the further rotation of manifold 347 within housing 315. In addition, such interlocking tabs cause any further clockwise rotation of lockable surface door 223/323, after the arrest of relative rotation between manifold 347 and housing 215/315, to translate into interlocking and tightening rotation of lockable surface door 223/323. More specifically, such further rotation causes threads 351 to tighten against threads 353, further sealing and locking surface door 223/323 onto the remainder of portable security device 201/301, and thereby sealing a central storage chamber 221/321. To further lock and secure locking surface door 223/323 in place (the closed position pictured in FIG. 2) the further rotation of grip flanges 224 may, at a point of designed maximum tightness of lockable surface door 223/323 with associated reacting forces from the structures of device 201/301, cause grip flanges 224 and a hub 226 to rotate further clockwise (the opposite rotational direction of that pictured by motion arrow 243) relative to the remainder of lockable surface door 223/323. The precise level of force required to drive tabs 224 sufficiently to cause them to so rotate may be determined by a rotation-resisting spring, fastened to both: (1) tabs 224 or hub 226, or both of them; and (2) axel 241 (if axel 241 is rotationally fixed to the remainder of lockable surface door 223/323 but not tabs 224 or hub 226) or the remainder of lockable surface door 223/323. Alternatively, such a rotation-resisting spring may be fastened to axel 241 and the remainder of lockable surface door 223/323, if axel 241 is fixed to hub 226 and tabs 224. Thus, by selecting a spring with a maximum force at a maximum extension (prior to deformation) exceeding that necessary for optimal tightness of door 223/323 on the remainder of device 201/301, optimal tightness settings can be encouraged, while using the additional rotation of tabs 224 against the remainder of door 223/323 to driving an additional, further locking aspect of door 223/323, as described immediately below.

Turning again to FIG. 3 in particular, an exemplary door lock mechanism 355 is shown on door 323, which is now pictured in the open, lifted position (as opposed to the closed, lowered position of the door 223, shown in FIG. 2). A cog 357, attached and rotationally fixed to tabs 224, can be driven by the rotation of tabs 224 and thus forced to spin counter-clockwise, from the perspective shown in FIG. 3, in reaction to sufficient tightening, clockwise rotation of tabs 224 shown in FIG. 2. (Owing to the differing positions of door 223/323 in FIGS. 2 and 3, these two rotational directions are the same.) As cog 357 is driven clockwise (in the perspective shown in FIG. 3), its teeth, such as the examples shown as 359, in turn, drive teeth 361 of an interfacing rail 363. Interfacing rail 363, in turn, is driven generally downward (in the perspective of FIG. 3) as directed by a rail-guiding channel 365, toward a bolt exit port 366. Rail 363 is attached to locking bolt 367 and, as a result of the downward movement of rail 363, illustrated by motion arrow 368, is caused to exit port 366, as shown by motion arrow 370. If placed in the closed position, and sufficiently tightened to the correct position (which may be encouraged by rotational stops between door 323 and manifold 347), locking bolt 367 may then enter a corresponding mortise 369, positioned directly in front of exit port 366 when door 223/323 is in the closed position, locking door 223/323 in place. As will be explained in greater detail below, this locking extension of a bolt or other, alternative locking mechanism, (and, conversely, its unlocking retraction) may be driven by actuators or other control system controlled hardware, rather than being physically driven by hand, as discussed immediately above. In this way, and as will become apparent from the further description of aspects of the invention set forth below, a control system, such as that shown as 371, and such as the examples discussed below in reference to FIG. 6, at least partially comprised in device 201/301 may implement further locking and alerting techniques described elsewhere in this application. In some embodiments, the locked, unlocked or other condition of such a locking mechanism (or mechanisms) comprised in device 201/301 may also be sensed and communicated by sensory or other hardware comprised in device 201/301 and by the control system, to carry out further aspects of the invention as set forth in this application. Exemplary control system 371 may be electrically connected, or otherwise connected, to such actuators and sensors (and, preferably, a single actuator sensor/actuator unit is used to drive cog 357) to enable such control system control and communications.

This precise embodiment is illustrative, not exhaustive, of the many possibilities for carrying out this aspect of the invention. In alternative embodiments, outer threading 231 may be retracted by a contracting base, or may be driven by force-loading (such as a spring) to contract by rotation or other movements. Another handle, knob, other user interface or control system controlled actuator may also or alternatively used to drive the retraction of threading, ridges, tabs and sensor probes that aid in securing a portable security device in a ground in which it is installed, in some embodiments. In other embodiments, or in addition, a releasable barbed anchor may be used to better secure a portable security device, as will be discussed in greater detail below, with reference to FIG. 4.

Figure 4:
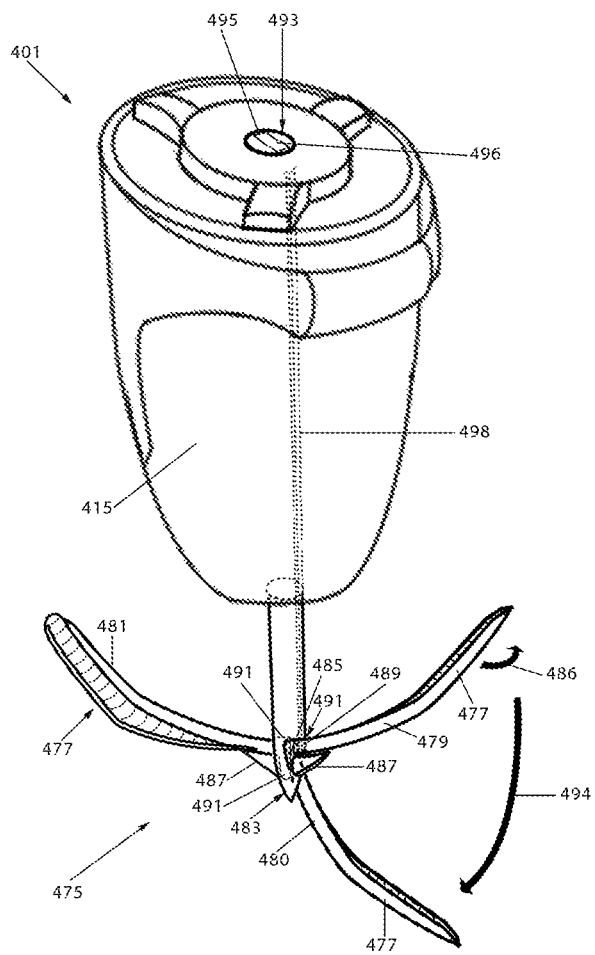
FIG. 4 is a perspective view of an alternative embodiment of a portable security device, comprising an implantable anchor with releasable barbs.

FIG. 4 is a perspective view of an alternative embodiment of a portable security device 401, comprising an implantable anchor 475 with releasable barbs 477. FIG. 4 illustrates two such releasable anchor barbs 477, namely, a left-hand barb 481 and a right-hand barb 479. Right-hand barb 479, unlike left-hand barb 481, is illustrated in two different positions: A locked, ground-holding position 479, and a releasing position 480. In a potential method of use of security device 401, a user may first drive portable security device downward (in the perspective of the figure) causing a penetrating tip 483, and then housing 415 behind it, to pierce the ground into which it is being installed. Because each barb 477 can pivot vertically upward in response to upward force (for example, turning on a rotational hinge 485 at their proximal ends), each barb 477 gives with, and does not substantially resist this installation process. However, barbs 477 are also capable of shifting laterally (as illustrated by rotational motion arrow 486), within the shaft of penetrating tip 483, into a locked position above barb-holding blocks 487, as shown by barb positions 479 and 481. In those locked positions, barbs 477 cannot rotate downward more than the positions shown as 479 and 481, due to encountering blocks 487, but can still rotate upward to allow installation. To allow lateral shifting, in the perspective of the figure, notch-closing tabs, such as the example shown as 489, can be pulled upward from a lowered position, in which they block the rightward sections of notches 491. Because the rightward sections of notches 491 have vertically wider and lower voids, a barb shifted into the rightward sections of notches 491 may be lowered into a released position, such as that shown as 480. To remove notch-closing tabs 489, which otherwise occupy and prevent the occupation of the rightward sections of notches 491, keyed hub 493 may be twisted counter-clockwise, pulling a tab connector 498 sideways, and, due to axial shear and resulting vertical shortening, tab 489 is lifted upward and out of the rightward section of one of notches 491. To prevent the unauthorized release of barbs 477 to the released position, such as that shown as 480, from the locked position, such as that illustrated by 479 (along a path shown by motion arrow 494), a lock, such as keyed rotational lock and tumbler 495 with keyhole 496, may be included in some embodiments. In such embodiments, keyed hub 493 will not twist and remove notch-closing tabs 489 unless and until a matching key is inserted by a user or, in some embodiments, authorization is otherwise established by a control system governing such a notch-releasing or other anchor aspect-releasing mechanism.

Figure 5:
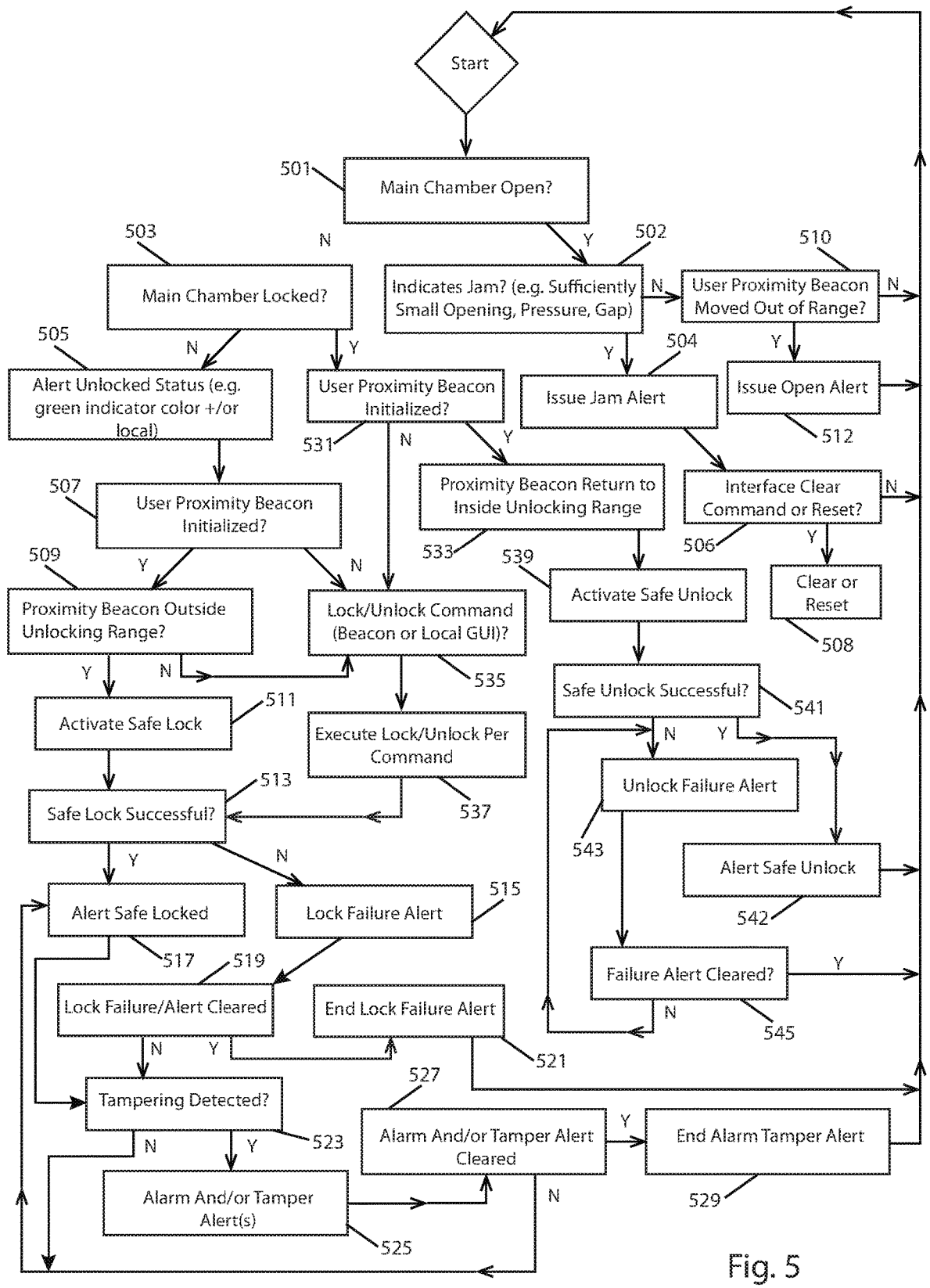
FIG. 5 is a process flow diagram depicting exemplary steps that may be executed by a control system implementing exemplary programming, methodology and other aspects of the present invention.

FIG. 5 is a process flow diagram depicting exemplary steps 500 that may be carried out by a control system implementing exemplary programming, methodology and other aspects of the present invention. An exemplary control system, which may be used to implement the various steps 500, and other aspects of the invention, is provided in FIG. 6 and the related discussion set forth below, among other places. Beginning with step 501, the control system first determines, for example, by using sensors comprised in the control system and a portable security device (such as any of the portable security devices discussed with reference to FIGS. 1-4, above), whether a Main Chamber (such as the central storage chamber 321 of FIG. 3) is presently open (for example, because door 323 is open). If not, the control system proceeds to step 503, in which it further determines whether the Main Chamber is locked, as well as closed.

Figure 8:
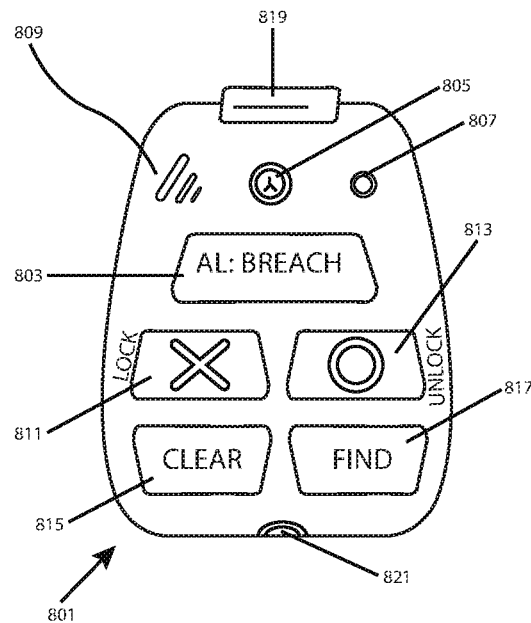
FIG. 8 is a front view of an exemplary tag, beacon and fob for use in conjunction with a portable security device and associated control system, in accordance with aspects of the present invention.
Figure 9:
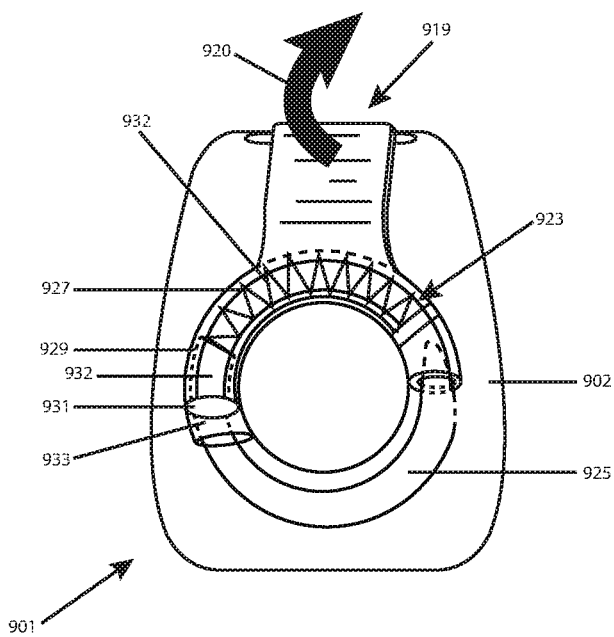
FIG. 9 is a rear view of the exemplary tag, beacon and fob set forth with reference to FIG. 8, above, in accordance with aspects of the present invention.
Figure 10:
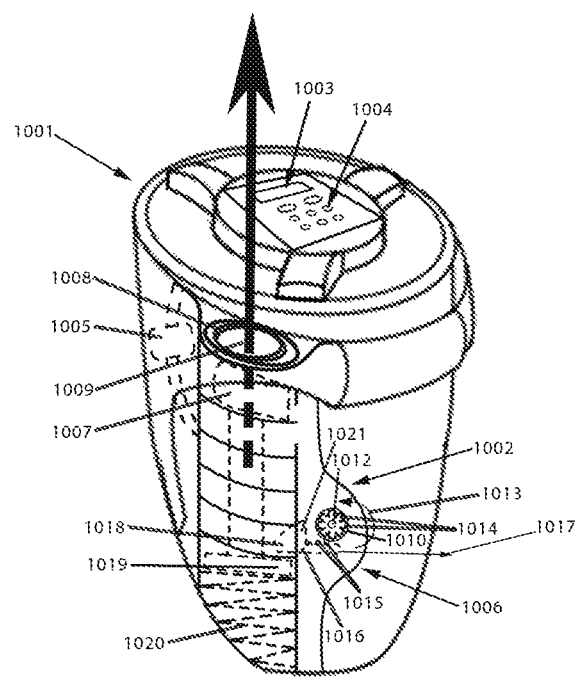
FIG. 10 is a perspective view of another alternative embodiment of a portable security device, comprising an actuable location-signaling flag device, display and other input/output controls.

If the Main Chamber is open at step 501, the control system instead proceeds to step 502, in which it determines whether a door or other opening of the portable security device is in a condition indicating that it has jammed, or otherwise failed to close despite an attempt to close it. Among other techniques, the control system may so determine the presence of such a jam by utilizing sensors that detect and indicate conditions associated with an incomplete door closure if present (conditions such as a sufficiently small gap in closure indicating some, but not complete closure, or pressure differentials or a broken seal indicating uneven seating of a door in a closed position) to the control system. If such an incomplete door closure is detected, the control system may then issue an alert to a user or other person(s) that the portable security device is "Jammed," or "Failed to Close," in step 504. As discussed further with reference to FIGS. 8, 9 and 10, below, such alerts can be issued to a user or other person aurally, visually, tactilely, or in any other practicable, uniquely identifying way, and may be issued by the control system using hardware comprised in the personal security device or, in some embodiments, by an external fob, smartphone, pda or other auxiliary control device. As shown in FIGS. 8, 9 and 10, either the portable security device or an external device may comprise user interface controls, such as a graphical user interface ("GUI"), through which a user or other person may receive such alerts and enter commands for the control system to "Clear" alerts such as the alert(s) issued in step 504, or reset the personal security device control system, as set forth in subsequent steps 506 and 508. If the user does not so clear or reset the control system, the control system may continue to issue alerts to the user, by returning to step 504. If the user does clear or reset the control system in step 508, the control system returns to the starting position. Turning our attention back to step 502, if no jam is determined by the control system to be present, the control system may proceed to step 510, in which it determines whether the user and/or a tag, beacon or fob in communication with the control system and present on or about the user has moved away from the portable security device by a sufficient distance, indicating that the user has departed his or her personal area comprising the portable security device. In some aspects of the invention, this distance indicating departure (or, "departure distance") may be set by the user, and may also comprise a threshold amount of time, or other departure behavior indicating conditions (e.g., speed of departure, or amount of distance away from the portable security device may trigger a shorter threshold of time) beyond which the control system may take further action. In any event, if the departure distance is so exceeded, or other conditions indicate the user's intent to depart, the control system may then proceed to issue an alert to the user that the portable security device is "Open" in step 512. In some embodiments, a system-controlled motor on a device controlling the closure of the portable security device (such as a door arm actuator) may also, or instead, close the portable security device in step 512, and then return to the starting position. After such time, or if the user is not determined to be beyond the departure distance (or other conditions do not indicate the user's intent to depart) the control system returns to the starting position without issuing the alerts set forth in steps 510 and 512.

Turning our attention back to step 503, if the control system determines that the portable security device is closed, but not locked, the control system proceeds to step 505, in which it may indicate a distinct alert (for example, on a graphical user interface, "GUI," located on the portable security device or on separate hardware) indicating to the user that the portable security device is "Unlocked," for example, in a green LED readout stating so. After doing so, the control system may next proceed to step 507, in which it determines whether a user proximity beacon, tag, smartphone, pda, or other separate device for determining the distance of the portable security device from it, or from a user holding it, has been initialized or is otherwise detectable and recognized by the control system. For example, in some embodiments, the control system pings such external devices with a communication signal, and then determines if an authorized or otherwise recognized return signal is later received. From the length of time a return signal takes to be received in response, or other aspects of the return signal, the control system may determine the distance of the user and external device from the portable security device. If such an external device is determined to be initialized, the control system next determines, in step 509, whether the external device (and therefore the user) is outside of the "departure distance," as defined above. An exemplary departure distance is illustrated in FIG. 1 as departure distance perimeter 126. If so, the control system then proceeds to step 511, in which it activates a locking mechanism to lock the portable security device—for example, the locking mechanism 355 discussed in reference to FIG. 3, above. The portable security device should then be locked, securing any valuables present in its main chamber from theft, and further is put in a condition for detecting movement or tampering, issuing alarms and alerts in the event of such movement or tampering and, in some embodiments, identifying the location of the portable security device to a user—when the user breaches a "returning distance perimeter" such as that shown as 128, or when the user presses a button requesting a location identification from the control system. In any event, proceeding to step 513, the control system assesses whether the locking mechanism succeeded in locking the portable security device and, in either event, issues appropriate alerts indicating failure or success to a user, in steps 515 and 517, respectively. If the portable security device failed to lock, and a lock failure alert is issued to a user in step 515, the control system proceeds to step 519 and determines whether the lock failure alert has been cleared by the user. If so, the control system proceeds to step 521 in which it ends the lock failure alert and returns to the starting position. If movement, stress or another tampering stimulus is detected by sensors or other hardware on the portable security device, it is then communicated to the control system in step 523 which determines whether theft or other tampering is detected, following steps 517 or 519, as indicated in the figure. If such tampering is determined to have taken place, the control system then proceeds to step 525, in which it issues a general tampering alarm to all persons in the vicinity. In some embodiments, the control system may also issue alerts regarding tampering to the user, law enforcement personnel, or other classes of persons, in addition to the general tampering alarm. Preferably, the general tampering alarm is, at least in part, audible, and sufficiently loud to alert anyone in the vicinity of the portable security device. Also preferably, any hardware causing the general tampering alarm is itself secured against tampering, and contains multiple, spaced points of exit for alarm sound, to make muffling or other disabling difficult for unauthorized users. Upon returning to his or her personal area comprising the portable security device, the user may determine that the tampering alarm is not, or is no longer necessary and, in such instances, may turn off or "clear" the alarm in step 527, ending the issuance of the alarm and alerts, if applicable, in step 529. The control system then returns to the starting position.

Turning back to step 503, if the control system determines that the Main Chamber of the portable security device is locked, it may next proceed in step 531, as in step 507, to determine whether a user proximity beacon, tag, smartphone, PDA, or other separate device for determining the distance of the portable security device from it, or from a user holding it, has been initialized or is otherwise detectable and recognized by the control system. If so, the control system proceeds to determine if the separate device, or the user holding it, is within a returning distance perimeter, in step 533. If such a separate device has not been initialized, the control system proceeds without the use of such devices, in steps 535 and 537, to carry out local or other locking, unlocking and other commands and actions provided directly to the control system or portable security device, for example through a local GUI or other controls on the portable security device, as illustrated, for example, in FIG. 10, below. If, however, such separate devices are initialized, and a user is detected to return within a returning distance perimeter, the control system proceeds, in step 539 to cause the portable security device to unlock and, in some embodiments, open, via actuation hardware controlled by the control system. If the user has not returned or manually disarmed the security device in step 533 or 535, the control system may proceed to step 523 to monitor sensors of tampering stimulus, an proceed with the subsequent steps. In some embodiments, and as alluded to above, the control system may also issue a location-indicating alert as an audible alert, or visible flag raised above the sand level, to demonstrate the position of the portable security device to a user returning within the returning distance perimeter in step 533. In some embodiments, the user may also trigger such unlocking and location-indicating alerts via a command to the control system, for example, via a smartphone or fob networked or otherwise in communication with the control system of the portable security device.

Following step 539, if the control system determines that the portable security device has been unlocked successfully in step 541, it may proceed to alert the user of its unlocked status in some embodiments, as indicated in step 542, and then returns to the starting position. If the control system determines that safe has not unlocked successfully, it may proceed to step 543, in which it alerts user(s) that there has been an unlocking failure and, optionally, further troubleshooting information. If the user clears or resets the unlocking failure alert, or otherwise clears the issues leading to the unlocking failure, in step 545, the control system ceases to issue such unlocking failure alerts and related information, and returns to the starting position. Otherwise, the control system repeats its alert and related information by returning to step 543.

Figure 6:
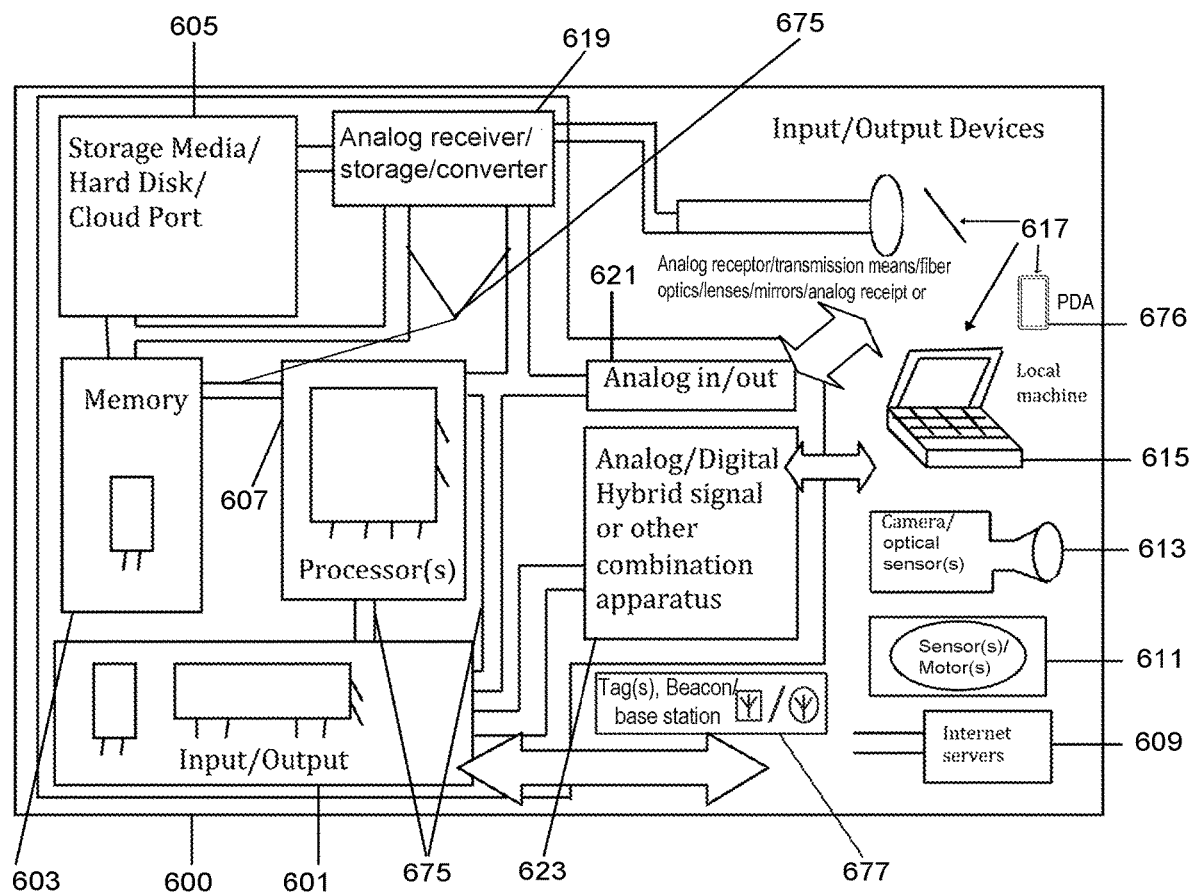
FIG. 6 is a schematic block diagram of some elements of an exemplary control system that may be used in accordance with aspects of the present invention.

FIG. 6 is a schematic block diagram of some elements of an exemplary control system 600 that may be used in accordance with aspects of the present invention, such as, but not limited to, issuing alerts and alarms, monitoring the position of a user and/or associated beacon or fob, locking or unlocking personal security devices with hardware and peripheral devices, and communicating and controlling the functions of a fob or other remote control device, such as a PDA or smartphone. The generic and other components and aspects described herein are not exhaustive of the many different systems and variations, including a number of possible hardware aspects and machine-readable media that might be used, in accordance with the present invention. Rather, the system 600 is described to make clear how aspects may be implemented. Among other components, the system 600 includes an input/output device 601, a memory device 603, storage media and/or hard disk recorder and/or cloud storage port or connection device 605, and a processor or processors 607. The processor(s) 607 is (are) capable of receiving, interpreting, processing and manipulating signals and executing instructions for further processing and for output, pre-output or storage in and outside of the system. The processor(s) 607 may be general or multipurpose, single- or multi-threaded, and may have a single core or several processor cores, including, but not limited to, microprocessors. Among other things, the processor(s) 607 is/are capable of processing signals and instructions for the input/output device 601, analog receiver/storage/converter device 619, analog in/out device 621, and/or analog/digital or other combination apparatus 623 to cause a display, light-affecting apparatus and/or other user interface with active physical controls, such as indicator buttons and displays, and control actuation and other monitoring hardware, any of which may be comprised or partially comprised in a GUI, to be provided for use by a user on hardware, such as a specialized personal computer monitor, fob or PDA (Personal Digital Assistant) or control unit screen (including, but not limited to, monitors or touch- and gesture-actuable displays) or a terminal monitor with a mouse and keyboard or other input hardware and presentation and input software (as in a software application GUI), and/or other physical controls, such as buttons, knobs, LEDs or LCDs. Alternatively, or in addition, the system, using processors 607 and input/output devices 619, 621 and/or 623, may accept and exert passive and other physical (e.g., tactile) user, power supply, appliance operation, user activity, circuit and environmental input (e.g., from sensors) and output.

For example, and in connection with aspects of the invention discussed in reference to other figures set forth in the present application, the system may carry out any aspects of the present invention as necessary with associated hardware and/or using specialized software, including, but not limited to, controlling the locked and unlocked status of a safe or other personal security device, arming alarms, sending alerts, detecting tampering stimuli, indicating locations, causing a fob to float by expansion, issuing and receiving user commands, and establishing and conducting networked communications. The system may also, among many other things described for control systems in this application, respond to user, sensor and other input (for example, by a user-actuated GUI controlled by computer hardware and software or by another physical control) to issue alerts, alter settings (such as perimeter distances and other factors triggering locking, arming and alerts), control alarms and alerts following tampering stimuli, initialize beacons or fobs, authenticate users and give and receive instructions and commands to other devices and users, or perform any other aspect of the invention requiring or benefiting from use of a control system. The system 601 may permit the user and/or system-variation of settings, including but not limited to the affects of user activity on modes of operation of the system, and send external alerts and other communications (for example, to users or other administrators) via external communication devices, for any control system and control unit aspect that may require or benefit from such external or system-extending communications.

The processor(s) 607 is/are capable of processing instructions stored in memory devices 603 and/or 605 (and/or ROM or RAM), and may communicate with any of these, and/or any other connected component, via system buses 675. Input/output device 601 is capable of input/output operations for the system, and may include/communicate with any number of input and/or output hardware, such as a computer mouse, keyboard, entry pad, actuable display, networked or connected second computer or processing device, control unit, other GUI aspects, camera(s) or scanner (s), sensor(s), sensor/motor(s), actuable electronic components (with actuation instruction receiving and following hardware), RF antennas, other radiation or electrical characteristics reading, monitoring, storage and transmission affecting hardware, as discussed in this application, range-finders, GPS systems, receiver(s), transmitter(s), transceiver (s), transflecting transceivers ("transflecters" or "transponders"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a graphical user interface "GUI". Such a GUI hardware unit and other input/output devices could, among other things, implement a user interface created by machine-readable means, such as software, permitting the user to carry out any of the user settings, commands and input/output discussed above, and elsewhere in this application.

601, 603, 605, 607, 619, 621 and 623 are connected and able to communicate communications, transmissions and instructions via system busses 675. Storage media and/or hard disk recorder and/or cloud storage port or connection device 605 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, and/or may be an internal mass storage device, such as a computer hard drive or optical drive.

Generally speaking, the system may be implemented as a client/server arrangement, where features of the invention are performed on a remote server, networked to the client and facilitated by software on both the client computer and server computer. Input and output devices may deliver their input and receive output by any known means of communicating and/or transmitting communications, signals, commands and/or data input/output, including, but not limited to, input through the devices illustrated in examples shown as 617, such as 609, 611, 613, 615, 676 and 677 and any other devices, hardware or other input/output generating and receiving aspects—e.g., a PDA networked to control a control unit 677 with the aid of specialized software (a.k.a. a "PDA Application" or "App."). Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and radiation or whole ambient light or other radio frequency ("RF") information for an environmental region may be taken by a photovoltaic apparatus for battery cell recharging if battery power is included as the power source for the control system, or sensor(s) dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may become such an "ambient power" source harnessed to power the operations of a control unit and/or control system and/or may include such sensory directional and 3D locational or other operations-identifying information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers, appliance-identifying files, or operations-relevant recordings, or metadata, if such direct or data encoded sources are used. In addition to keys, codes entered into a GUI, and fob or beacon signals, authentication aspects of the present invention may also or alternatively be carried out with biometric challenge and detection hardware, such as fingerprint, iris, DNA or other pattern scans While the illustrated system example 600 may be helpful to understand the implementation of aspects of the invention, it should be understood that any form of computer system may be used to implement many control system and other aspects of the invention—for example, a simpler computer system containing just a processor (datapath and control) for executing instructions from a memory or transmission source. The aspects or features set forth may be implemented with, as alternatives, and/or in any combination, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 7:
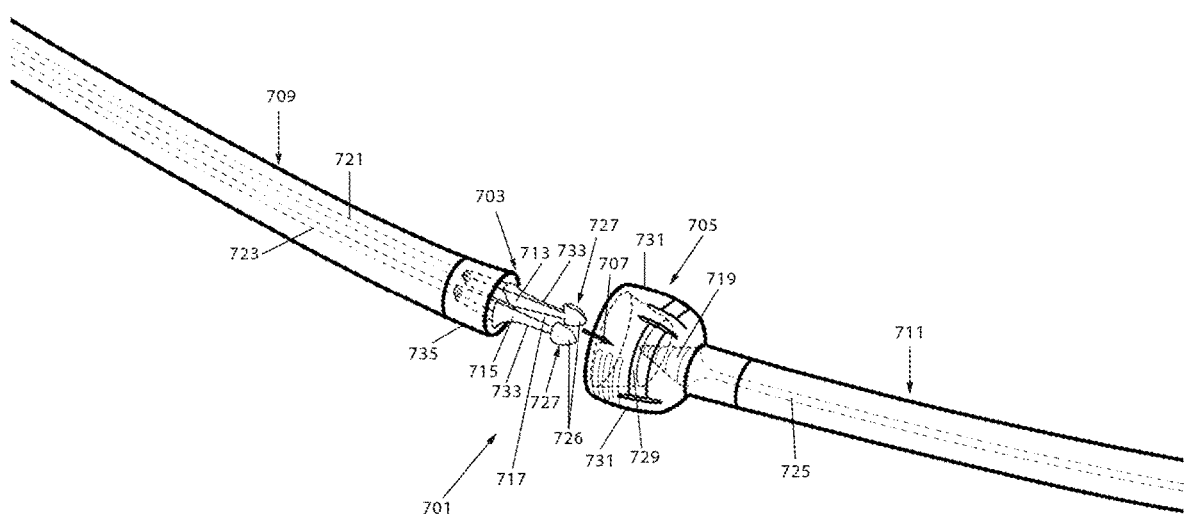
FIG. 7 is a perspective view of an exemplary signaling clip, in accordance with aspects of the present invention.

FIG. 7 is a perspective view of an exemplary signaling clip 701, for tethering peripheral hardware to a portable security device, and enabling the portable security device to communicate with, control, and be controlled by, such peripheral hardware, in accordance with aspects of the present invention. Signaling clip 701 comprises two major components: A) male insertion tab set 703; and B) female tab holder 705. By inserting male insertion tab set 703 into female tab holder 705, as demonstrated by motion arrow 707, a user can join a left-hand tether section, 709, with another, right-hand tether section, 711. As discussed above, with reference to FIG. 1, a user may use a physical or communications tether, such as that created by so joining sections 709 and 711, to apply many of the security, alerting and other functions of a portable security device to another item, such as a bag or other valuable item. A complete tether created by joining set 703 and holder 705 can, thus, connect a portable security device, on the right hand, with a peripheral device or item, on the left hand. For example, as shown in FIG. 1, a user's backpack, on the left hand, may be joined to a portable security device, on the right hand, among innumerable other possibilities within the scope of the invention. However, because FIG. 7 provides an enlarged view of details of the tether and signaling clip 701, the joined components, and part of the tether, are not depicted in this figure. However, to facilitate discussion, the larger context of such exemplary components are shown in FIG. 1. That larger context should be borne in mind to better understand the aspects of the invention discussed herein.

As mentioned above, by connecting set 703 and holder 705, a user may physically complete a binding tether, joining a portable security device with a peripheral item. In this way, and especially if the tether is then drawn taught enough, the later movement of the joined peripheral component can be detected as physical movement by the portable security device, and may then cause alarms and alerts to be issued (among other aspects of the present invention) if the movement is determined to be a tampering stimulus. In more detail, after fastening set 703 inside holder 705, a user may further cause tether slack to be retracted, for example, by pressing a button 138 triggering a tether spool retraction within the peripheral component, inside a tether slot or other opening 140. As also discussed previously, a communications connection, such as a wired communication network, may also be established by joining set 703 with holder 705. In one embodiment, set forth specifically in FIG. 7, an electrically conductive connection is created joining set 703 and holder 705. As set 703 is inserted into holder 705, two tabs, 713 and 715, are initially electrically separated by a physical gap 717. However, as tabs 713 and 715 are inserted into holder 705, rounded tab heads 726 are pressed toward one another, and each is pressed against a conductive cone 719, which becomes inserted between them. As a result, electrical conduction, and charge movement, becomes possible between tabs 713 and 715, and between connected electrical wires 721 and 723 within tether section 709, which wires 721 and 723 are otherwise insulated from one another. Simultaneously, electrical conduction also becomes possible between tabs 713 and 715 and cone 719 (as well as electrical wire 725, which is electrically connected to cone 719). As a result, an electrical circuit may be completed, through which signals and power may be transferred, establishing communications or power supply from the tethered portable security device and the peripheral component, either or both of which may comprise a control system, such as the control systems discussed in reference to the present invention. Further, the presence of a completed tether and connection may be detected by a control system monitoring such charge movement, leading to further actions, steps and techniques as set forth in the present invention, such as applying tampering detection techniques from the portable security device to the peripheral component, and initiating the uptake of tether slack. Although the example of electrical conduction is provided herein, it should be understood that any form of conduction permitted by physical adjoining and adjustment may also, or alternatively, be used to simultaneously establish physical and communications connections, as set forth in this application. The discussion of electrical conduction is illustrative, but not exhaustive, of aspects falling within the scope of the invention, as will be understood by those of ordinary skill in the art.

To establish a reversible physical connection between tab set 703 and holder 705, tabs 713 and 715 comprise one-way barbs 727 which clip into and hold a flat inner ring surface 729, within holder 705, when set 703 is fully inserted into holder 705. Cone 719 aids in creating and maintaining outward holding pressure between barbs 727 and ring surface 729, at the same time as aiding in maintaining a communications connection. To reverse both connections, releasing tether sections 709 and 711 from one another, a user may squeeze the outer surface 731 of holder 705 which, because it is composed of a somewhat flexible material, or sides, flexes inward. Because tabs 713 and 715 comprise flattened outer surfaces 733, and may rotate within a pivoting ring 735 within tether section 709, they become oriented vertically between a user digits, and are pushed together, when a user squeezes outer surface 731. Ring surface 729 is not flexible, or as flexible, as outer surface 731 and, as a result, is then larger than the profile of barbs 727 of tabs 713 and 715 when they are squeezed together, and, due to outward pressure created by cone 719 (which itself is flexible and creates an outward force bias) tabs 713 and 715 are then ejected from holder 705. An added benefit of the self-aligning pivotable tabs 713 and 715 is that outer surface 731 may be squeezed on any opposing inward set of directions, and tabs 713 and 715 may be inserted in any rotational alignment into holder 705.

FIG. 8 is a front view of an exemplary tag, beacon or fob 801 for use in conjunction with a portable security device and associated control system, in accordance with aspects of the present invention. The use of such a tag, beacon and fob is discussed, among other places, in reference to FIGS. 1, 5 and 6, above. Briefly, a tag, beacon or fob such as 801 may be used to determine whether a user has moved past a departure distance 126 or has returned to a returning perimeter 128 or personal area 119, and to communicate commands and information to and from a user and a control system of a portable security device, in accordance with aspects of the invention set forth in this application, among other things. As such, in addition to comprising a tag that may be pinged by such a control system or a beacon transmitting signals to a control system to establish the distance of tag, beacon or fob 801 (and, by inference, a user holding or wearing it), fob 801 may comprise user interface hardware, such as a GUI and physical controls. More specifically, fob 801 may comprise a graphical display section 803, such as a liquid crystal display ("LCD"), which a control system may cause to display various alerts and other statuses and other information concerning its operation, and the operation of a portable security device communicating with 801, for a user. For example, display 803 may display a wide variety of alerts, as discussed in reference to FIG. 5, above, and such as the "AL: Breach" alert set forth in the figure, signifying that tampering or another breach of the integrity of the portable security device has occurred. To cause such displays to occur, the control system may communicate signals uniquely coded for a computer chip and/or control system on board 801 to translate into and generate such alerts and statuses on display 803. To receive such signals, and issue its own command and other signals, fob 801 further comprises an antenna 805, or other signal transmission hardware, in communication with a control system. Preferably, display 803, antenna 805 and other hardware of fob 801 is powered, as required, by a local power source, such as a battery. However, in some embodiments, external, ambient or other power sources are used, or power is not required to issue signals from fob 801, because it influences external signals passively. Fob 801 may also comprise a simpler, auxiliary or other display, such as light-emitting diode ("LED") 807. LED 807 may supplement alerts, statuses and other communications from fob 801, the control system or display 803. Preferably, power-related and signaling information and emergency alerts for fob 801 and the control system are provided by LED 807—such as flashing red when tampering is detected in the portable security device associated with 801, or when power is low in 801 of the portable security device, or green when the portable security device has been locked, but a wide variety of information may be relayed by LED 807 and, in some embodiments, either or both of displays 803 and 807 may be omitted—for example, to reduce production costs. Fob 801 may further comprise an audio speaker 809, through which the fob 801 and/or control system may issue audible alerts, statuses or other information, in much the same way that visible alerts, statuses or other information may be provided by displays 803 and 807. Preferably, alerts of a nature requiring immediate action of the user, such as a tampering stimulus alert or a failed lock alert related to the portable security device, triggered by signals from the portable security device, are provided through audio speaker 809.

A user may provide commands to the control system through physical controls comprised in fob 801. For example, a user may command the control system to lock (or, in some embodiments, close and lock or unlock and then relock or attempt to clear a failed lock and then lock) a portable security device controlled by such a control system, using locking command button 811. Similarly, a user may use unlocking command button 813 to unlock (or, in some embodiments, unlock and open or clear a failed unlock attempt and again attempt to unlock and/or open) such a portable security device. In some embodiments, unlocking command button 813 may also be used to clear false alarms or other control system and portable security device malfunctions, or to deactivate, clear or reduce alarms, alerts or other portable security device and control system functions but, preferably, clearing button 815 is instead also provided for those user command functions. In some embodiments, a "Find" button 817 is also provided on fob 801. By pressing the "Find" button, the control system of an associated portable security device is commanded to signal the location of the portable security device to the user, in ways discussed elsewhere in this application. For example, upon a user pressing the "Find" button, the fob may communicate a signal to the control system causing the portable security device to raise a location-indicating flag with a linear actuator, as set forth in greater detail in reference to FIG. 10, below. In some embodiments, a fob clip may be provided, as will be discussed in greater detail below with reference to FIG. 9. In such instances, a rotational hinge 819 of the clip may be visible from the front side of fob 801. Similarly, in some embodiments, flotation sensors may be included in fob 801 and, if so, preferably either an air- or water-sensor, or material absence sensor, such as water absence sensor 821, may be visible from the front side of fob 801.

FIG. 9 is a rear view of the exemplary tag, beacon and fob, now shown as 901, set forth with reference to FIG. 8, above, in accordance with aspects of the present invention. From the reverse side in comparison to that depicted in FIG. 8, an optional fob clip 923 can be seen more completely. As mentioned above, such a fob clip may be more easily accessed by a user by rotating it away from the main body 902 of fob 901, on rotational hinge 919. Rotational hinge 919 is preferably spring-loaded, and biased toward closure against body 902, as pictured in the figure, but, in some embodiments, may rotate freely about hinge 919, as shown by motion arrow 920, without force biasing.

As pictured in fob position 170 of FIG. 1, fob 801/901 may be fastened to a user's clothing, in addition to the possibility of being carried about. To aid in so fastening tag, beacon and fob 801/901, a pivoting, round pin 925 may be provided. A spring or other force-biasing device 927 may tend to eject and fully extend pin 925 from a pin-guiding chamber and ring component 929. Because chamber and ring component 929 and pin 925 are each circular in shape, and pin 925 is smaller in diameter than chamber/component 929, pin 925 may be retracted into chamber/component 929, by pulling clockwise a tab 931, accessible through slot 932, which tab 931 is attached to the base 933 of pin 925, held within chamber/component 929. At the user's option, chamber/component 929 and pin 925 may also be used to secure keys or other objects to fob 801/901, because they form a ring complementary to, and able to pierce, key-ring holes of keys. The main body of fob clip 923 may itself also be used to clip fob 901 to a user's clothing, especially in embodiments with a hinge 919 force-biased toward closing clip 923 against the remainder of fob 901 (by sandwiching the edge of clothing between them.

FIG. 10 is a perspective view depicting another alternative embodiment of a portable security device 1001, comprising an actuable location-signaling flag device 1002, and a display 1003 and input controls 1004. Flag device 1002 may be used, as set forth in greater detail above, for example with reference to FIGS. 1, 5, 6 and 8, to provide location indications. To briefly recap, a user may trigger such location indications by returning to personal area and entering within a returning distance perimeter, having previously exceeded a departure distance from security device 1001, as may be assessed by a wide variety of user, tag, beacon and fob hardware, among many other possibilities discussed in the present application. A user may also, in accordance with aspects of the invention set forth above, actively request an indication of the location of security device 1001, for example, by pressing "Find" button 817 of an authenticated remote fob 801, commonly networked or communicating with, and controlling operations of, security device 1001, via methods and hardware discussed with reference to FIGS. 1, 5, 6 and 8.

Assuming that a location indication from security device 1001 has been triggered or actively requested by an authenticated user, as discussed above, a control system 1005 at least partially comprised in security device 1001 may control hardware causing a linear actuator 1006 to raise a flag 1007 through sand-sealed port 1008. The tip 1009 of flag 1007 preferably is complementarily-shaped and forms a substantial seal with port 1008, whether flag 1007 is raised (position not pictured) or lowered (as pictured), preventing the entry of sand into flag device 1002. Control system 1005 may cause flag 1007 to be raised, and therefore to indicate the location of portable security device 1001, by controlling rotary electric motor 1010, powered by a power source (not pictured). By powering motor 1010, and causing it to spin in the counter-clockwise rotational direction (in the perspective of the figure), a cog 1011 connected to the driveshaft axel 1012 of motor 1010 is also driven in the same counter-clockwise rotational direction, as demonstrated by motion arrow 1013. Gear teeth, such as the examples shown as 1014, of cog 1011 interface with, and drive, complementarily-shaped gear teeth 1015 of a rail 1016, and drive rail 1016 toward the right-hand side of the figure, as demonstrated by motion arrow 1017. A locking tab 1018 is attached at the left-hand end of rail 1016, and, when sufficiently withdrawn, to the right, will release a tab 1019, attached at the base of raisable/lowerable flag 1007. As a result, flag 1007 will then be driven upward by spring 1020, and raised through port 1008, at the command of the control system causing a location indication which causes the motor actuation and resulting cascade of events set forth above (for example, in response to a user pressing the "find" button 817 of fob 801). When holding one another in an interlocked position, however, and when flag 1007 is sufficiently lowered (for example, by hand), as pictured, tab 1018 holds tab 1019, and holds flag 1007 in a lowered position. Tab 1018 comprises a sloped side 1021, facing generally toward port 1008. Along with an optional spring between and connecting tab 1018 and rail 1016, to create lateral play, (not pictured) tab 1018 can be extended to the left by the control system (in response to a lowering/locking command) after permitting a flag to be lowered by hand, because tab 1019 is able to push past tab 1018, but is then held by it, on a flattened, opposite side of tab 1018.

The display 1003 and user input controls 1004 permit a user to issue commands, obtain alerts, provide or receive other communications, and carry out other operations related to portable security device 1001 using control system 1005. Some of those possible commands, alerts, communications and operations are set forth above, with reference to FIGS. 1, 5, 6 and 8. As an example, a user may be required to enter an authentication code using input controls 1004, or complete an authentication routine (for example, by holding an authenticated fob near enough to portable security device 1001), before being permitted to enter further commands to manage device 1001. Such further commands may include locking or unlocking portable security device 1001, setting tamper detection hardware and alarms or alerts, among many other examples. As discussed above, such input and display aspects may be provided, alternatively or in addition, via an external device (such as a fob or smartphone commonly networked with control system 1005). An exemplary control system is provided above, in reference to FIG. 6.

Figure 11:
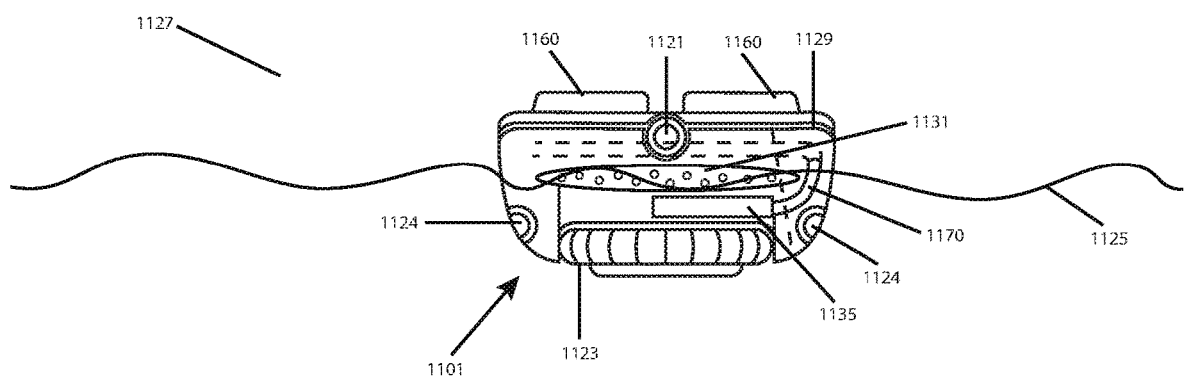
FIG. 11 is a side view of the exemplary tag, beacon and fob set forth with reference to FIGS. 8 and 9, above, floating about the surface of a volume of water, in accordance with aspects of the present invention.

FIG. 11 is a side view of the exemplary tag, beacon and fob, now shown as 1101, set forth with reference to FIGS. 8 and 9, above, floating about the surface of a volume of water, in accordance with aspects of the present invention. Preferably, fob 1101 has an overall density and ballast orientation causing it to float in fresh or salt water with at least one sensor—namely, water absence sensor 1121—above, and one at least one sensor, such as water or pressure sensors 1124, below the resulting water line 1125, as pictured. As a result, when dropped in any way into a body of water, fob 1101 will become positioned as pictured in FIG. 11. For example, fob clip 923/1123 may be constructed at least in part of a material of greater density than the remainder of fob 1101, and act as a keel, causing the floating orientation pictured. In this way, even if a user loses control of fob 1101 when in or over a body of water, fob 1101 will remain visible, with audio speaker 809 and display 807 (not pictured in the present figure) able to communicate alerts over the air 1127. Furthermore, because water-detecting sensors 1124 will become submerged, but air absence sensor 1121 will remain exposed to air (due, in some embodiments, to water-exiting channels near or surrounding sensor 1121, channeling water away from it when above water), a control system in communication with sensors 1121 and 1123 may determine that fob 1101 has fallen into water, and is floating. Based on that determination, fob 1101 may begin to issue alerts to the user, indicating that it has been dropped into the water, and indicating the location of fob 1101. Such alerts may include audible tones, and a flashing LED, or alerts viewed on another device, such as a portable security device or smartphone, which may be commonly networked with, or otherwise in communication with, fob 1101.

In the event that fob 1101 fails to float in water, fob 1101 may determine that it is being held underwater due to normal use (e.g., held in the pocket of the user, or otherwise attached to submerged clothing). In any event, preferably, a substantial time delay without cure of the sensed floating condition, and/or minimum length of time with floating detection, is required by fob 1101 upon detecting that it is floating, prior to implementing the floating status alerts set forth above, to minimize the odds of a false detection of a floating condition. In some embodiments, an outward limit for a determination that fob 1101 is completely submerged, and at a sufficient pressure to indicate a greater depth for a greater length of time than occurring during swimming, may cause part of fob 1101 to inflate with air or other low-density matter, allowing it to overcome some factors causing it to sink to the bottom of a body of water—such as attached keys. An expansion joint 1129 may be provided to enable such inflation, in a air-sealed, flexible chamber 1131. Preferably, floating status and location alerts are then provided by fob 1101. All of the settings for the time measurements set forth above may be variably set by the user or system, according to preferences or other conditions. A control unit 1135 may direct and control the sensor hardware 1121 and 1124 and buttons 1160, via internal conductive leads 1170. To protect leads 1170 during inflation, as described above, a flexible strap may hold the top and lower sections of fob 1101 (separated by joint 1129) on the right-hand side.

Figure 12:
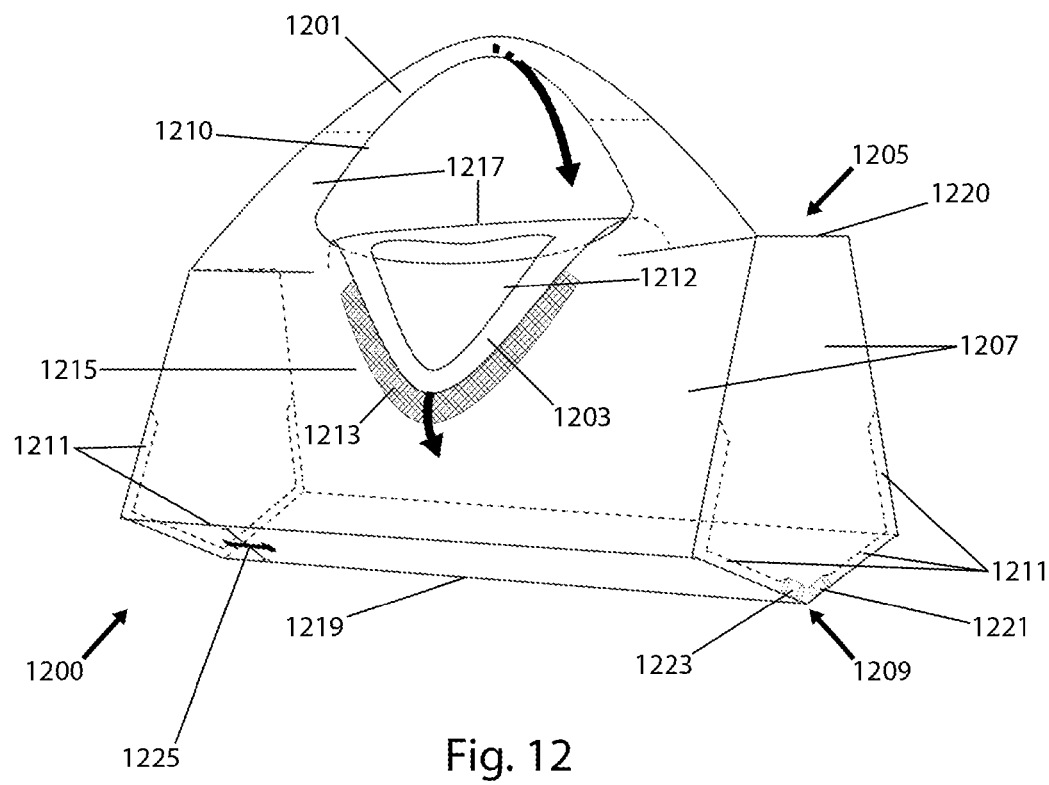
FIG. 12 is a perspective view of an exemplary flexible shopping bag, convertible to a more rigid shipping box, in accordance with aspects of the present invention.

FIG. 12 is a perspective view of an exemplary flexible shopping bag 1200, convertible to a more rigid shipping box, in accordance with aspects of the present invention. As with many existing shopping bags, shopping bag 1200 may comprise two upper handles, 1201 and 1203, for easy toting by a user (shopper) of purchased goods held within an internal storage cavity 1205.

When carried by hand, holding both handles 1201 and 1203, bag 1200 generally may be a flexible container (especially in a "bag" configuration, wherein handles 1201 and 1203 are loose and accessible for carrying bag 1200, as partially shown for handle 1201). Handles 1201 and 1203 are attached to flexible bag walls, such as the examples shown as 1207, which comprise a flexible material, such as plastic, cellulose, or fabric. In one optional feature, unlocked hinges (such as exemplary hinge 1209) joining rigid supports, such as exemplary rigid supports 1211, allow for temporary, reversible flexibility or rigidity of the bag walls 1207. In some embodiments, those walls may be locked or otherwise fixed in movement, in bag conversion steps, set forth below. In any event, that flexibility allows for the comfortable, streamlined transportation of purchased goods by a shopper, with a minimal bag profile, with walls 1207 tending to hug the goods held within cavity 1205.

However, as mentioned above, bag 1200 is rapidly convertible to a different, more rigid and uniform configuration, without loose handles (a.k.a. a "box" configuration, as partially shown for handle 1203). To convert shopping bag 1200 to such a box configuration, handle 1203, which may be smaller than handle 1201, although with a similar, comparable or identical length, is threaded through the handle hole 1210 of handle 1201, and fastened to a fastening or adhesive area 1213, on an outer wall 1215 of bag 1200. Rigid or semi-rigid panels 1217 within handle 1203 (and/or handle 1201), as well as rigid internal supports, such as those pictured as 1211, then encourage and create the formation of rigid walls, such as resulting wall 1215.

In some embodiments, an external processing device automatically converts bag 1200 into a box configuration, when a user places handle holes 1210 and 1212 onto a handle separating hook conveyance device (discussed in greater detail, below). Similarly to handle 1203, handle 1201 also may be folded over the top 1220 of bag 1200, and fastened to a fastening or adhesive area (not pictured) of a similar shape and composition as 1213. Either fastening or adhesive area, and the inward facing surfaces of the handles, may be fortified with more robust material, fasteners (such as Velcro), adhesives, or other adhesive aspects, which may encourage permanent or reversible adhesion between the handles and the adhesive areas. To complete the conversion to a box configuration, the bottom 1219 (and other areas) of bag may be placed on a flat surface, aligning rigid supports 1211 along hinges such as 1209 while inward, lateral pressure then locks hinge components into a rigid configuration (e.g., by pushing small end rod 1221 into larger, but fitting, end tube 1223—in some embodiments, with barbing or another locking mechanism). In embodiments including the use of an external processing device, the external processing device may deliver that hinge-locking lateral pressure (e.g., with system-controlled, motorized clamps held just above a flat surface on which flat surfaces of bag 1200 are placed). The external processing device also places and may cause the adhesion of the handles to outer surfaces of bag 1200 (e.g., by heat stamping, welding or applying an adhesive, between them).

As also discussed in greater detail below, to aid in receiving, stowing, shipping and other processing by such a processing device, a scannable code symbol 1225 may be placed on bag 1200. Aspects of such a code symbol are discussed in greater detail, immediately below.

Figure 13:
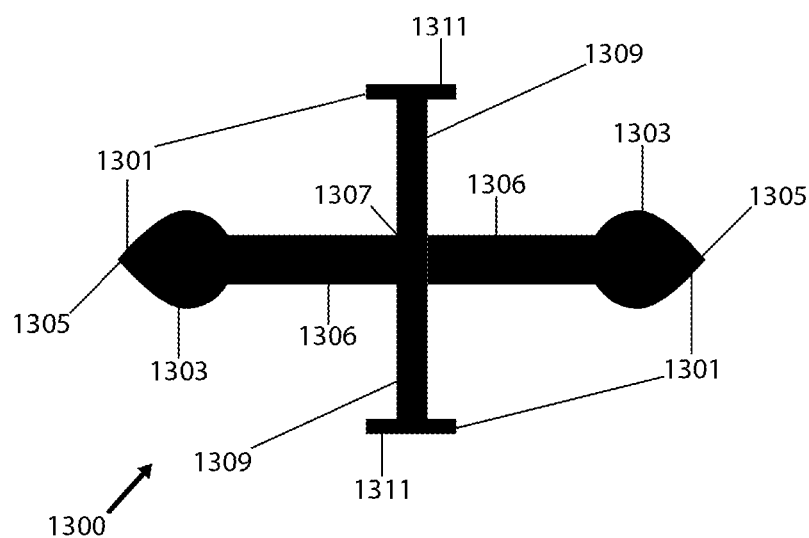
FIG. 13 depicts an exemplary multi-dimensionally palindromic coded symbol, configured for rapidly scanning and determining a type of convertible shopping bag, in accordance with aspects of the present invention.

FIG. 13 depicts an exemplary multi-dimensionally palindromic coded symbol 1300, configured for rapidly scanning and determining a type of convertible shopping bag, in accordance with aspects of the present invention. Symbol 1300 comprises several sub-features. First, it is palindromic, meaning that it is identical when read or otherwise scanned, in at least two directions. In some embodiments, symbol 1300 is 3-dimensional, and palindromic in 3 dimensions (identical when read in at least three directions, and, preferably, when read in any direction). Symbol 1300 comprises starting and scan-initiating end anchors, examples of which are shown as 1301. Some such scan-initiating end anchors, such as the examples shown as 1303, comprise a distinct scannable pattern (e.g., by camera or other optical sensor and optical character recognition techniques) indicating that scanning or other processing of the symbol 1300 should begin on that (or a similar) end. A control system, such as the control system set forth above, in reference to FIG. 6, above, initiates reading or scanning symbol 1300 from an anchor 1303 inward (the direction opposite anchor end point 1305) along primary bar element 1306. The control system continues to scan inward until reaching a crossing 1307 with a secondary scannable bar element 1309. At this stage, the control system may then scan and determine the length (or apparent length, by sensor area receiving an image) of primary bar element 1306, either up to the crossing, or along its entire length, in some embodiments. The resulting reading is then stored as a first or, "primary feature length." The control system them proceeds to scan and read secondary element 1306 (this time, preferably, outward from the crossing 1307, to a scan-ending anchor, such as the example shown as 1311). At this stage, the control system may then scan and determine the length (or apparent length, by sensor area receiving an image) of secondary bar element 1309, either up to the scan-ending anchor 1311 from crossing 1307, or along its entire length, in some embodiments. The resulting reading is then stored as a first or, "secondary feature length."

The control system next compares the stored primary feature length with the stored secondary feature length, creating and storing a ratio between the two lengths. In this way, in some embodiments, the distance and other particular attributes of a sensor from symbol 1300 during scanning is irrelevant to reading sensor, while symbol 1300 comprises a minimal, unambiguous, palindromic profile. The ratio is then compared to a library of stored ratios stored within or accessible to the control system, and matched to one such stored ratio associated with a particular container type and/or weight or other information regarding a container and/or the contents within, or a deal related to, a container labeled with the symbol. Thus, a series of symbols, similar to exemplary symbol 1300, but with differing relative lengths (and length ratios) between such primary and secondary scannable symbolic elements, can be used to differentiate and quickly scan and determine the nature of a particular package being handled by a system, such as the system set forth in greater detail below, for receiving, stowing, and shipping containers (such as BagBoxes).

Figure 14:
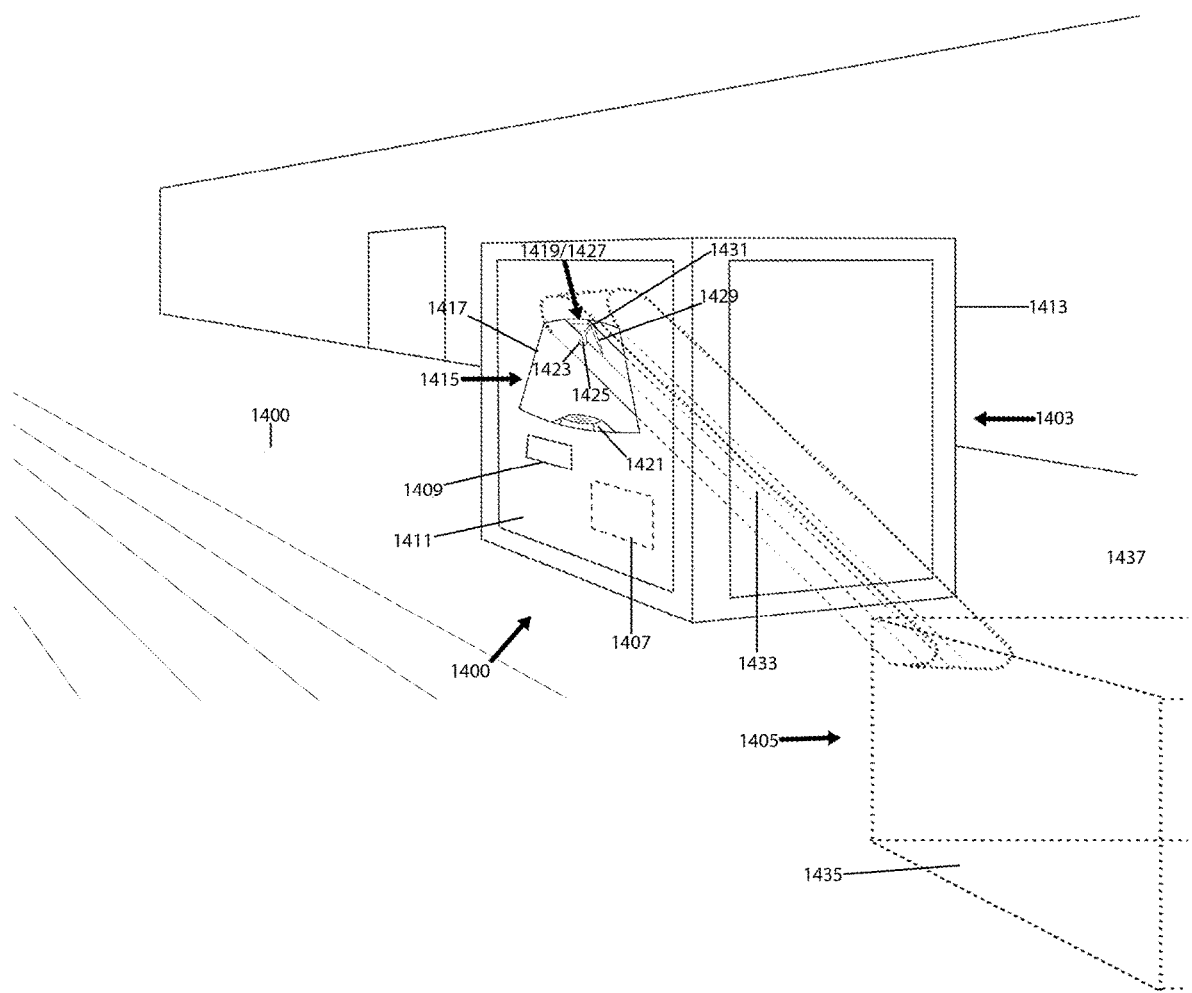
FIG. 14 is a perspective view of an exemplary drop facility, configured to receive, stow, convert and ship convertible shopping bags, such as the convertible shopping bag discussed above, in reference to FIG. 12, in an exemplary shopping environment—namely, an exemplary courtyard of a shopping mall.

FIG. 14 is a perspective view of an exemplary drop facility 1400, configured to receive, stow, convert and ship convertible shopping bags, such as the convertible BagBox shopping bag discussed above, in reference to FIG. 12, in an exemplary shopping environment—namely, an exemplary courtyard of a shopping mall 1401. Generally speaking, drop facility 1400 may comprise: 1) a customer-visible, above-ground section 1403, for servicing and interaction with a retail customer, including receiving convertible shopping bags, and 2) a hidden, below-ground section 1405, for stowing, converting and shipping convertible shopping bags, out of the way of shoppers.

Above-ground section 1403 comprises and/or is controlled by a control system 1407 (which may be a control system such as that set forth above, in reference to FIG. 6, above), and each of the components discussed herein, and the steps set forth in reference to the subsequent figure (FIG. 15) may be carried out by such a control system. Among those components connected with and controlled by control system 1407 is an outward-facing user-actuable display 1409, which may be located on an outer wall 1411 of an external kiosk 1413. Display 1409 may be any suitable display for providing a GUI to a user, comprising, but not limited to, a touchscreen displaying instructions, requests and other output, and actuable elements and fields, to receive input from a user. In some embodiments, control system 1407 may be located, at least partially, in a different, remote area and networked with computer hardware located within facility 1400. In such embodiments, a user may initiate a transaction, shipping or stowing arrangement, with such an external control system, encoding a bag related to that arrangement at that other area location, and authorizing a receiving, stowing and/or shipping procedure at facility 1400, in accordance with steps set forth below, in reference to FIG. 15. Preferably, that authorization is an encrypted pre-authorization, in accordance with the steps set forth below, and is provided to that computer hardware at kiosk

1413 via the Internet, or another computer network, prior to a user's arrival at facility 1400. In this way, a rapid drop-off of a convertible bag can be made any time after that pre-authorization (e.g., after purchase from a nearby store, through its computer system, comprised within or comprising the control system 1407). In some embodiments, as discussed elsewhere in this application, a user may control such purchases and authorizations, at least in part, via a smart phone or other PDA, comprising or comprised in, such a control system, using a dedicated software application presenting the user with a specialized GUI, presenting and allowing the selection of, such options.

To receive a convertible bag, in accordance with aspects of the present invention, kiosk 1413 may comprise a bag-receiving and converting station 1415. Receiving and converting station 1415 comprises a drop-off window 1417 presenting a set of at least two conversion hooks 1419 above a sensor or scanner 1421. To drop off a convertible bag, such as BagBox 1200, a user places each of the convertible bag's handle loops (such as handles 1201 and 1203, discussed above) over a separate hook, such as hooks 1423 and 1425, within separable hook complex 1427. Each hook, 1423 and 1425 is separable from the other hook and separately articulated (e.g., by a motorized arm controlled by the control system) which may then separately direct each bag handle in opposing directions, passing one through the hole of the other, as discussed above, in reference to FIG. 12, to create a closed, rigid, box configuration, more suitable for stowing and shipping than a bag.

To aid in placing each handle of the BagBox on a separate hook, 1423 or 1425, a handle separator and placer 1429 may be provided. Handle separator 1429 may comprise an articulating spindle with a tapered tip, and may be pivoted inward about a hinge 1431, and between the handles of a bag held on either or both of hooks 1423 and 1425, separating the two handles and pushing each onto one, and only one, of hooks 1423 and 1425.

Either before or after the conversion steps set forth above, hook complex 1427 may descend, at the command of a user and/or control system, along a conveyor belt 1433, to a stowing and shipping station 1435 (depending on the type of transaction authorized, in accordance with the methods set forth below, in reference to FIG. 15.) For example, in the event that stowing, only, is authorized, the BagBox descending on complex 1427 may store the converted BagBox in a discrete location for future pickup by the user (e.g., a dedicated, secure locker, openable only by the user, with his or her exclusive authentication information, provided or stored by the control system). If shipping is also authorized, the control system may deliver the converted BagBox, via the conveyor belt, to a loading dock 1437, for delivery to the user's home (e.g., by a commercial carrier).

In some embodiments, an administrator or other user may select between these, and other actions, using a networked smartphone, PDA or other computer system (e.g., running an application controlling the receiving, stowing, shipping and other steps set forth in the present application).

Figure 15:
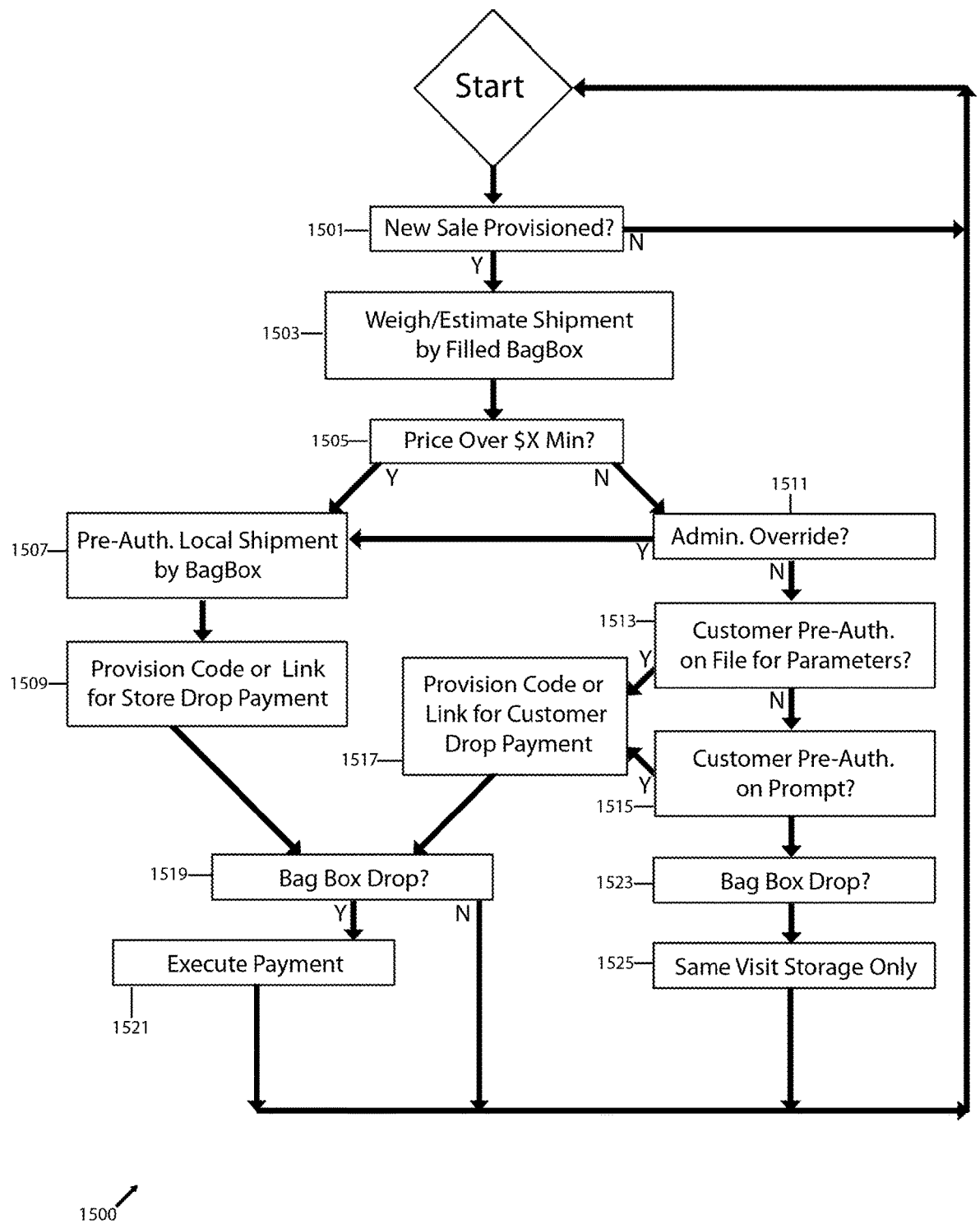
FIG. 15 is a process flow diagram depicting exemplary steps that may be executed by users and/or a control system implementing exemplary programming, methodology and other aspects of the present invention related to receiving, stowing, converting and shipping convertible shopping bags.

FIG. 15 is a process flow diagram depicting exemplary steps 1500 that may be executed by users and/or a control system, such as the control systems set forth above, in reference to FIGS. 6 and 14, implementing exemplary programming, methodology and other aspects of the present invention related to receiving, stowing, converting and shipping convertible shopping bags. In some embodiments, however, some or all of the steps set forth herein may be also, or alternatively, carried out by a user or another control system.

Beginning with step 1501, the control system first determines whether a new sale of goods has occurred, and been provisioned by the control system (or whether a control system in communication with the control system, such as a retail store's computer system has provided for such a sale of goods, recording it). If not, the control system returns to the starting position. If such a sale of goods has occurred, however, the control system may proceed to step 1503, in which it fills and/or weighs goods that have been, or will be, placed within a shopping bag at the point of sale (e.g., with a connected scale or scanner under the control of the control system.) As mentioned above, the shopping bag is preferably a convertible shopping bag, of the nature discussed above. After that weighing or other scanning of the goods purchased by a user, the control system may estimate or determine (e.g., using a networked shipping calculator) the cost (or possible costs) of shipping the weighed or scanned goods (e.g., by a commercial shipment service). In some embodiments, in optional step 1505, if the estimated or actual cost will exceed a particular predetermined dollar amount, which may vary based on the retail price of the goods paid by a customer/user, the control system proceeds to step 1507, in which it pre-authorizes shipment (or a particular cost or distance of shipment) by a commercial carrier, and will hold a retail store or its parent or affiliate company responsible for the cost in subsequent billing, based on its agreement to such automatic pre-authorizations based on the parameters for retail shipping based on dollar amount of the sale. By pre-authorizing shipment in this way, in step 1509, a code on the shopping bag is placed or associated with a potential subsequent shipment of the goods held within the shopping bag (preferably, at another location, remote from the retail store where the purchase took place, such as outdoor kiosk 1413, discussed above). Thus, if and when a customer subsequently drops off the shopping bag at such a location, in step 1519, the bag is converted and shipped from that location, at no direct cost to the customer, and the retail store instead has payment executed from its bank account to pay for the shipping, in step 1521. In some embodiments, the retail store itself may carry out the shipment, in which the payment steps will be excluded, and the store will instead retrieve and personally handle shipment of the goods to a location designated by the shopper/user (e.g., at sign-up with the store, or at the kiosk, using its interactive display).

If, however, the retail store that sold the goods to the customer/user has not pre-authorized any payment or other arrangements to ship the goods purchased, an agent handling the sale may, nonetheless, authorize such payment or arrangements as a special concession—for example, if requested by the customer, or if offered by an agent of the retail store as an incentive to purchase the goods—in step 1511. Preferably, an option is presented to a store clerk, manager or other agent on the store's own computer system, which is linked to the control system via an Internet or other network connection.

If no such administrative exception is made, however, the user must determine whether to pay for such shipping arrangements, or other aspects set forth in this application, in steps 1513 et seq. In step 1513, the control system may determine whether the customer/user has agreed to pre-authorize such services in a sign-up process through the control system. If so, the control system may automatically link or otherwise associate the customer/user's payment account with such a coded shopping bag and subsequent requests for service (e.g., dropping a convertible shopping bag associated by code by the control system at the kiosk, and requesting stowage or shipping) in step 1517. If no such agreement related to pre-authorizations is on file, however, the control system may proceed to step 1515, in which it prompts the user for such agreement to pre-authorization at the point of sale. If the user so agrees, the control system then may proceed to step 1517 based on that authorization, and proceeds to process and pay for any subsequent requests for storage and shipping services (by dropping the coded bag at a kiosk or other authorized shipping facility, such as a U.P.S. store), executing payment for such services through the user's linked financial account(s). In the event that a commercial carrier's shipping location, rather than a separate kiosk, is used for shipping fulfillment, a code suitable for that commercial carrier, rather than the particular types of codes set forth herein, may, instead be used. If no such agreement to pre-authorization has taken place, more limited receipt, stowing and shipping of coded shopping bags may still be permitted for shopping bags nonetheless dropped at a facility, in step 1523, in some embodiments. For example, in some embodiments, the BagBox dropped at a kiosk, as set forth above, may be reversibly converted and stored for a limited time (e.g., corresponding with the same visit to a shopping area by the user, such as during the same day, or a three hour interval, following the sale or drop-off at the kiosk). In such embodiments, the user would be permitted to retrieve the coded shopping bag at the kiosk location within that time frame, in step 1525, with the conveyor belt retrieving the bag for the user at the user's request using the kiosk's interactive display, in some embodiments.

I claim:

1. A method for carrying out receipt and stowing of a convertible shopping bag, comprising the following steps:
   providing the convertible shopping bag to a user;
   encoding said convertible shopping bag with a symbol and associating that symbol, using computer hardware and software, with a record of a purchase of goods made by said user;
   placing said goods within said convertible shopping bag;
   pre-authorizing, at a point of purchase of the goods, the receipt and stowing of said convertible shopping bag at a remote storage location;
   the user taking the convertible shopping bag with the goods and the symbol to the remote storage location;
   scanning the symbol on the convertible shopping bag at the remote storage location to confirm the pre-authorization of the receipt and stowing;
   receiving and stowing of the convertible shopping bag at the remote storage location;
   wherein said convertible shopping bag comprises:
      flexible components;
      at least one handle connected with an open top, wherein said open top is configured to be closed in a conversion operation;
      wherein said conversion operation creates a box-like shape, with rigid walls; and
      wherein a wall of said bag comprises said symbol.

2. The method for carrying out the receipt and stowing of the convertible shopping bag of claim 1, comprising the following additional step: converting said convertible shopping bag to said box-like shape.

3. The method for carrying out the receipt and stowing of the convertible shopping bag of claim 2, comprising the following additional step: the user pre-authorizing shipment of said convertible shopping bag by a commercial carrier.

4. The method for carrying out the receipt and stowing of the convertible shopping bag of claim 3, wherein said symbol can be used to confirm that the shipment of said convertible shopping bag by the commercial carrier is pre-authorized.

5. The method for carrying out the receipt and stowing of the convertible shopping bag of claim 2, comprising the following additional step: another user, who sold said goods to said user, pre-authorizing shipment of said convertible shopping bag by a commercial carrier.

6. The method for carrying out the receipt and stowing of the convertible shopping bag of claim 5, wherein said symbol can be used to confirm that the shipment of said convertible shopping bag by the commercial carrier is pre-authorized.

7. The method for carrying out the receipt and stowing of the convertible shopping bag of claim 1, wherein said at least one handle comprises at least two handles, each of said at least two handles being in the form of loop.

8. The method for carrying out the receipt and stowing of the convertible shopping bag of claim 1, wherein said conversion operation is facilitated by pivoting and locking hinges.

9. The method for carrying out the receipt and stowing of the convertible shopping bag of claim 8, wherein within said flexible components comprise said pivoting and locking hinges.

10. The method for carrying out the receipt and stowing of the convertible shopping bag of claim 1, wherein said symbol is encoded.

11. The method for carrying out the receipt and stowing of the convertible shopping bag of claim 10, wherein said symbol can be used to confirm that said conversion operation is authorized.

12. The method for carrying out the receipt and stowing of the convertible shopping bag of claim 1, comprising the following additional step: providing an at least partially underground shipping facility at said remote storage location, said at least partially underground shipping facility comprising a stowing and shipping station configured to accept said convertible shopping bag for shipping.

13. The method for carrying out the receipt and stowing of the convertible shopping bag of claim 12, wherein said partially underground shipping facility comprises a conveyance device, located at least partially underground.

14. The method for carrying out the receipt and stowing of the convertible shopping bag of claim 12, wherein at least part of said shipping facility is above-ground.

15. The method for carrying out the receipt and stowing of the convertible shopping bag of claim 14, wherein said above-ground part of said shipping facility is located within a shopping mall.

16. The method for carrying out the receipt and stowing of the convertible shopping bag of claim 15, wherein said above-ground part of said shipping facility is located outside of retail stores within said mall.

17. The method for carrying out the receipt and stowing of the convertible shopping bag of claim 14, wherein said above-ground part of said shipping facility comprises an entrance with a shape complementary to, and able to accept, said convertible shopping bag, before it has been converted.

18. The method for carrying out the receipt and stowing of the convertible shopping bag of claim 14, wherein said above-ground part of said shipping facility comprises at least part of a control system comprising computer hardware and a display.

* * * * *